(12) United States Patent
Beliveau

(10) Patent No.: US 11,096,525 B2
(45) Date of Patent: Aug. 24, 2021

(54) CHEESE GRATER

(71) Applicant: LES PROMOTIONS ATLANTIQUES INC., Longueuil (CA)

(72) Inventor: Stephane Beliveau, Longueuil (CA)

(73) Assignee: LES PROMOTIONS ATLANTIQUES INC., Longueuil (CA)

( * ) Notice: Subject to any disclaimer, the term of this patent is extended or adjusted under 35 U.S.C. 154(b) by 52 days.

(21) Appl. No.: 16/356,926

(22) Filed: Mar. 18, 2019

(65) Prior Publication Data
US 2019/0343336 A1 Nov. 14, 2019

Related U.S. Application Data

(60) Provisional application No. 62/644,016, filed on Mar. 16, 2018.

(51) Int. Cl.
*A47J 43/25* (2006.01)

(52) U.S. Cl.
CPC .................. *A47J 43/255* (2013.01)

(58) Field of Classification Search
CPC ............ A47J 43/255; A47J 43/25; A47K 5/09
See application file for complete search history.

(56) References Cited

U.S. PATENT DOCUMENTS

| | | | |
|---|---|---|---|
| 10,524,620 B1* | 1/2020 | Bindler | B02C 25/00 |
| 10,729,182 B2* | 8/2020 | Chen | A24F 40/48 |
| 2014/0014751 A1* | 1/2014 | Sampaio | A47J 43/255 |
| | | | 241/93 |

\* cited by examiner

*Primary Examiner* — Adam J Eiseman
*Assistant Examiner* — Chastin M. Brundidge
(74) *Attorney, Agent, or Firm* — Merchant & Gould P.C.

(57) ABSTRACT

A grating device is for grating a substantially solid product capable of being grated. A first housing of the grating device is positioned, shaped and sized for encasing the product to be grated. A second housing is operatively connectable to the first housing, the second housing having a loading section configured for receiving the product to be grated. A grating drum is rotatably mountable about the second housing, and positioned, shaped and sized for grating the product from the loading section of the second housing via rotation of the grating drum against the product. A biasing assembly is operatively cooperable with the first housing for biasing the product to be grated inside the loading section of the second housing towards and against the grating drum.

20 Claims, 35 Drawing Sheets

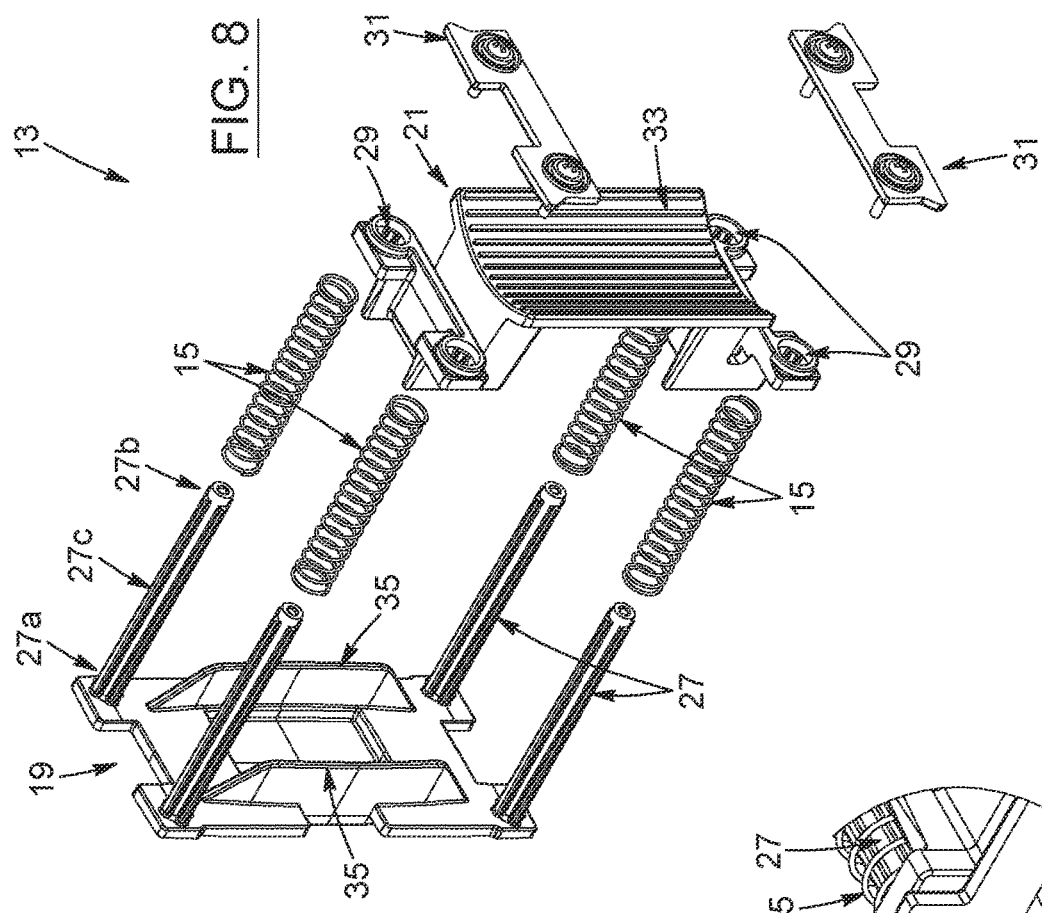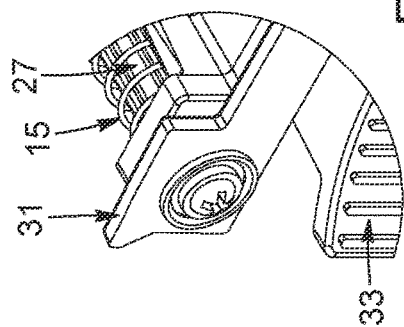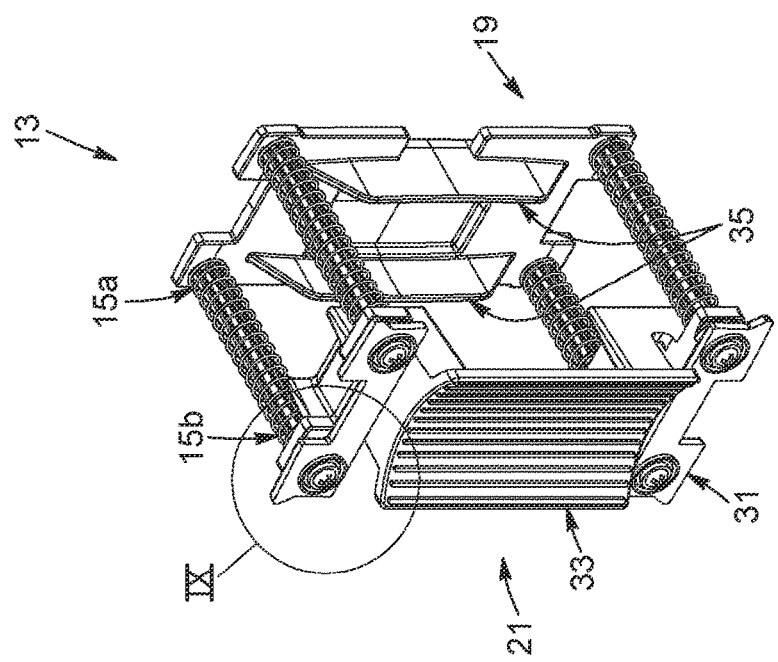

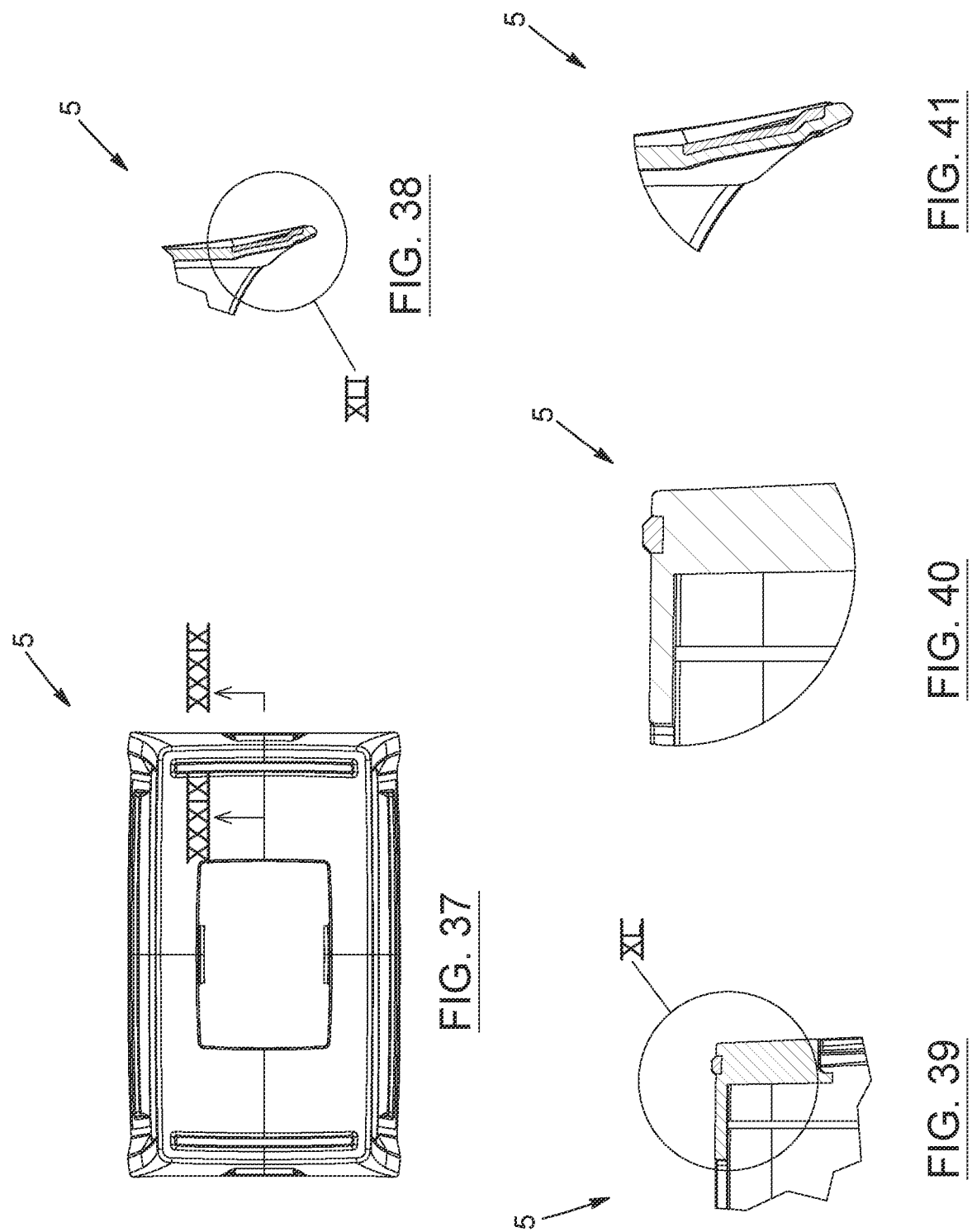

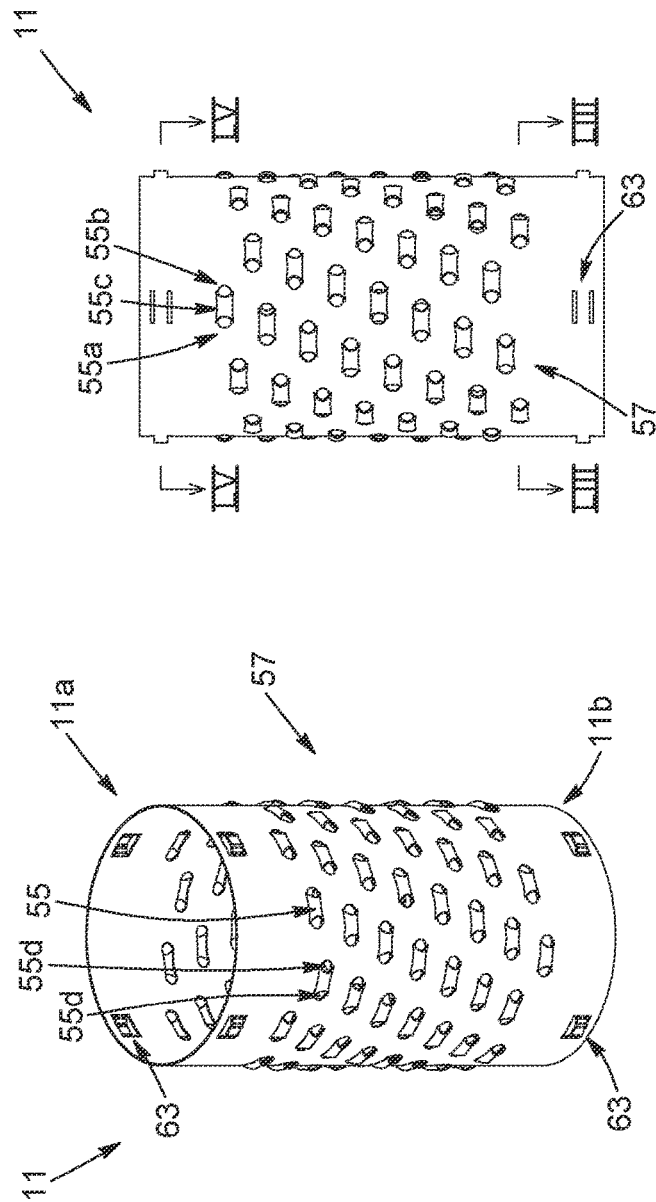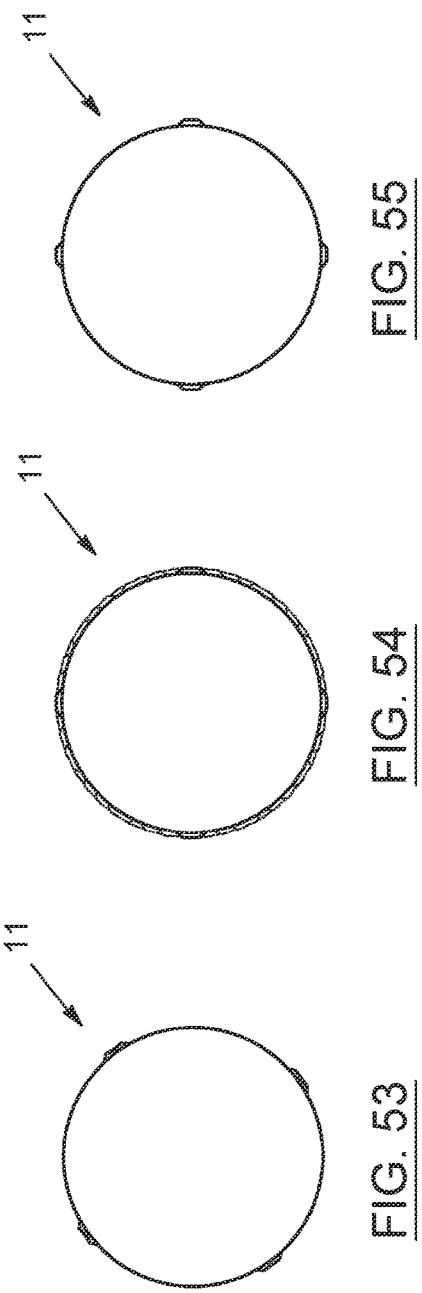

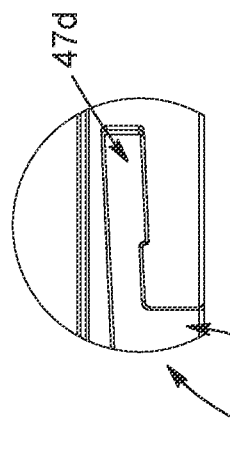
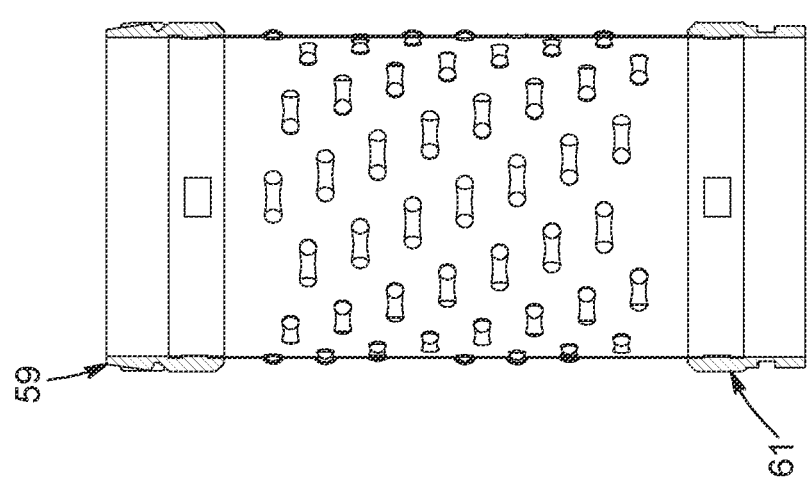
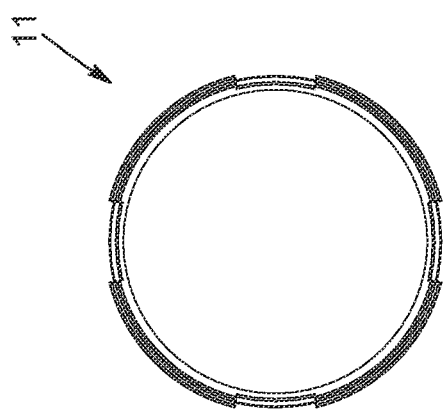
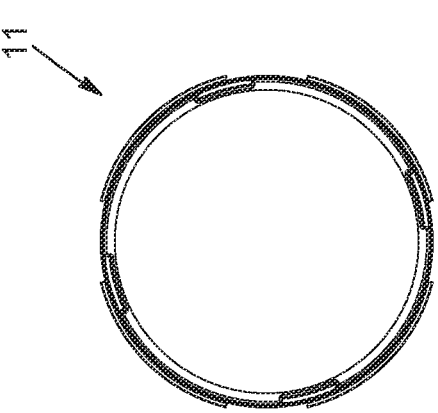

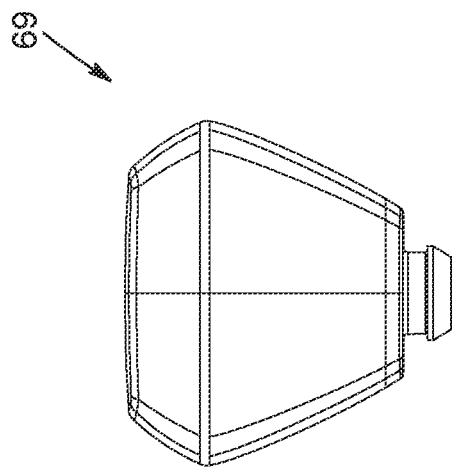
FIG. 77
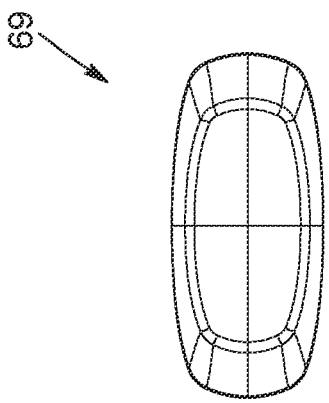
FIG. 79
FIG. 76
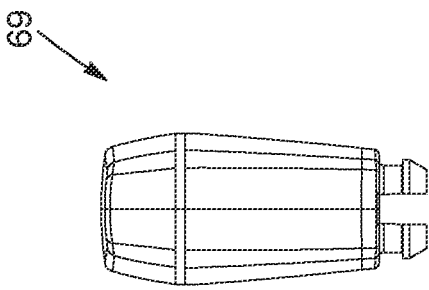
FIG. 78

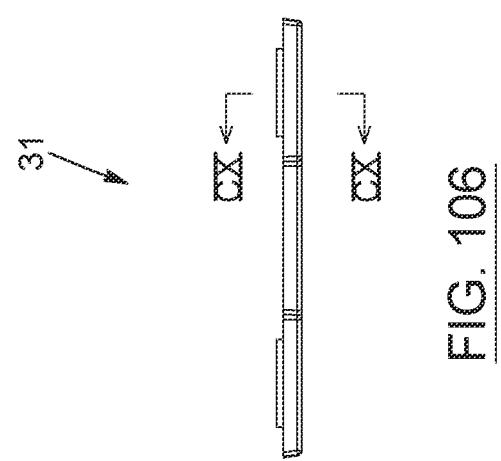
FIG. 106
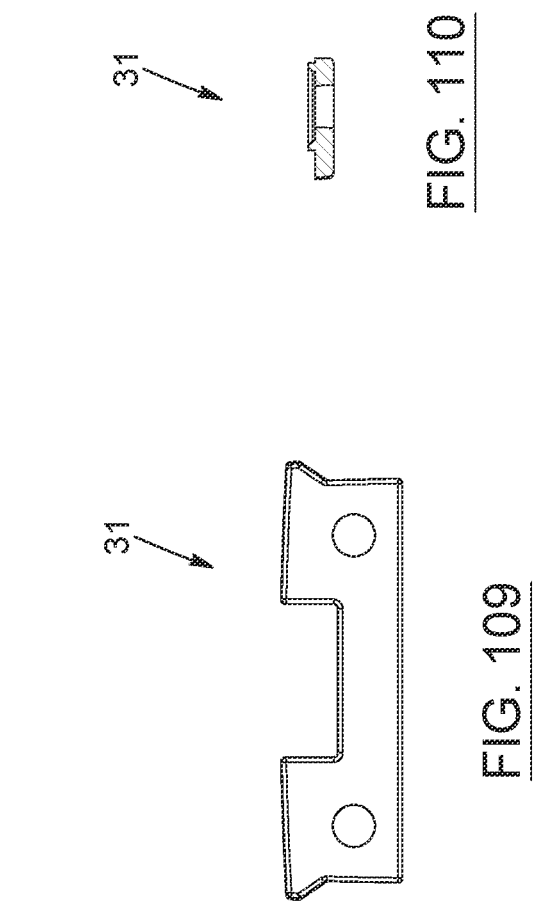
FIG. 107
FIG. 109
FIG. 110
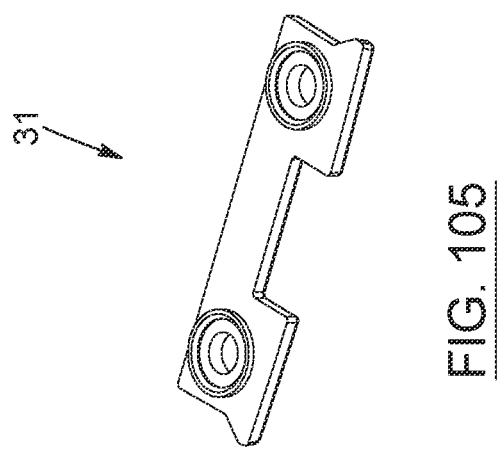
FIG. 105
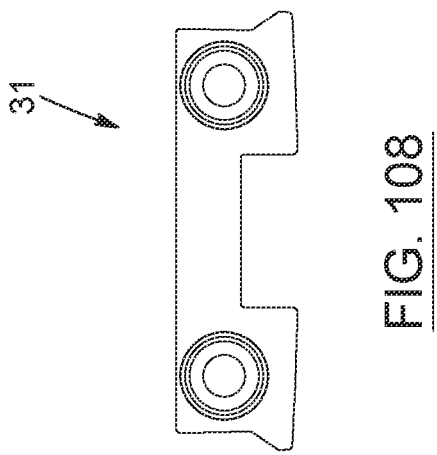
FIG. 108

CHEESE GRATER

This application claims benefit of U.S. Patent Application Ser. No. 62/644,016, filed 16 Mar. 2018 and which application is incorporated herein by reference. To the extent appropriate, a claim of priority is made to the above disclosed application.

FIELD OF THE INVENTION

The present invention relates to a grater. More particularly, the present invention relates to a new and improved grater for grating cheese and/or the like, and also relates to a kit for assembling the same, and to corresponding methods of assembling, operating and/or use associated thereto.

BACKGROUND OF THE INVENTION

Devices, such as graters for example, used for grating cheese and/or other similar substances, are well known in the art.

However, despite these known conventional devices, there is always a need to continue innovating and finding better and/or different ways of grating cheese (for example), in a quicker, easier, simpler, faster, more efficient, more economical, more reliable, more adjustable, more versatile, more adjustable, more sustainable and/or more desirable manner.

Indeed, it would be particularly useful to be able to provide an improved grating device which, by virtue of its design and components, would be able to overcome or at least minimize some of the known drawbacks associated with conventional systems.

SUMMARY OF THE INVENTION

An object of the present invention is to provide a new grating device which, by virtue of its design and components, is intended to satisfy the above-mentioned need and which is thus an improvement over other related graters, and/or grating devices, systems, assemblies and/or methods known in the prior art.

In accordance with the present invention, the above main object is achieved, as will be easily understood, with a grating device (and/or an associated method of grating) such as the one briefly described herein and such as the one exemplified in the accompanying drawings.

More particularly, according to one aspect of the present invention, there is provided a grating device for grating a substantially solid product capable of being grated, the grating device comprising:

a first housing being positioned, shaped and sized for encasing the product to be grated;

a second housing operatively connectable to the first housing, the second housing having a loading section being configured for receiving the product to be grated;

a grating drum rotatably mountable about the second housing, and being positioned, shaped and sized for grating the product from the loading section of the second housing via a rotation of the grating drum against said product; and a biasing assembly operatively cooperable with the first housing for biasing the product to be grated inside the loading section of the second housing towards and against the grating drum.

The present system is particularly advantageous in that, due to its components and features, the grating devices enables to grate material (ex. cheese, chocolate, etc.) more conveniently and more ergonomically.

According to another aspect of the present invention, there is provided an assembly, a system, a station and/or a machine provided with the above-mentioned grating device.

According to another aspect of the present invention, there is provided a method of manufacturing (ex. making, assembling, etc.) the above-mentioned grating device.

According to another aspect of the present invention, there is provided a method of operating and/or using the above-mentioned grating device.

According to another aspect of the present invention, there is provided an assembly, a system, a station and/or a machine for carrying out the above-mentioned method(s).

According to another aspect of the present invention, there is provided a method of grating using the above-mentioned grating device, assembly, system, station, machine, and/or components thereof.

According to another aspect of the present invention, there is provided a method of operating the above-mentioned grating device, assembly, system, station, machine, and/or components thereof.

According to another aspect of the present invention, there is provided a kit with corresponding components for assembling the above-mentioned grating device, assembly, system, station, machine, and/or components thereof.

According to yet another aspect of the present invention, there is also provided a set of components for interchanging with components of the above-mentioned kit.

According to yet another aspect of the present invention, there is also provided a method of assembling components of the above-mentioned kit and/or set.

According to yet another aspect of the present invention, there is also provided a method of doing business with the above-mentioned method(s), kit, set, grating device, assembly, system, station, machine, processing plant and/or components thereof.

According to yet another aspect of the present invention, there is also provided a product (ex. cheese, etc.) having been obtained and/or processed (modified, altered, grated, etc.) with the above-mentioned method(s), kit, grating device, assembly, system, station, machine, and/or components thereof.

The objects, advantages and other features of the present invention will become more apparent upon reading of the following non-restrictive description of preferred embodiments thereof, given for the purpose of exemplification only, with reference to the accompanying drawings.

DETAILED DESCRIPTION OF PREFERRED EMBODIMENTS OF THE INVENTION

Figure 2:
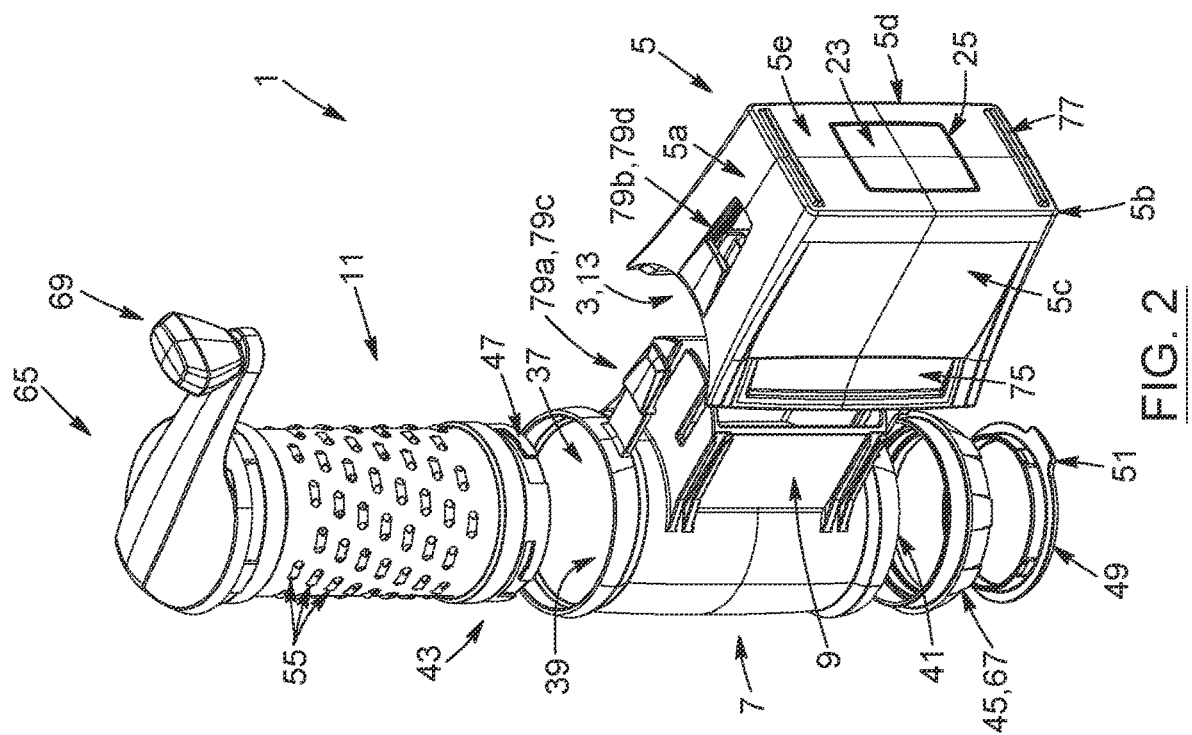
Figure 1:
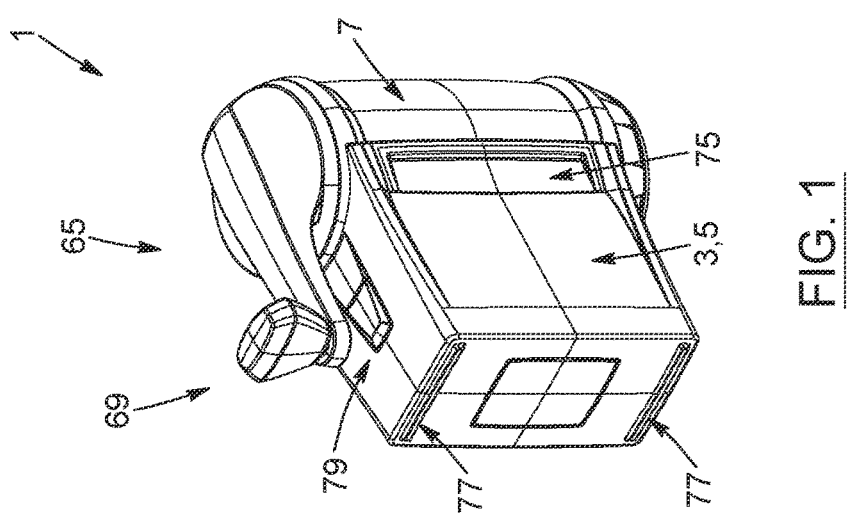
FIGS. 1-113 are different views of various aspects, components and features of a possible grating device (i.e. "cheese grater") and/or different configurations thereof according to preferred embodiments of the present invention.
Figure 4:
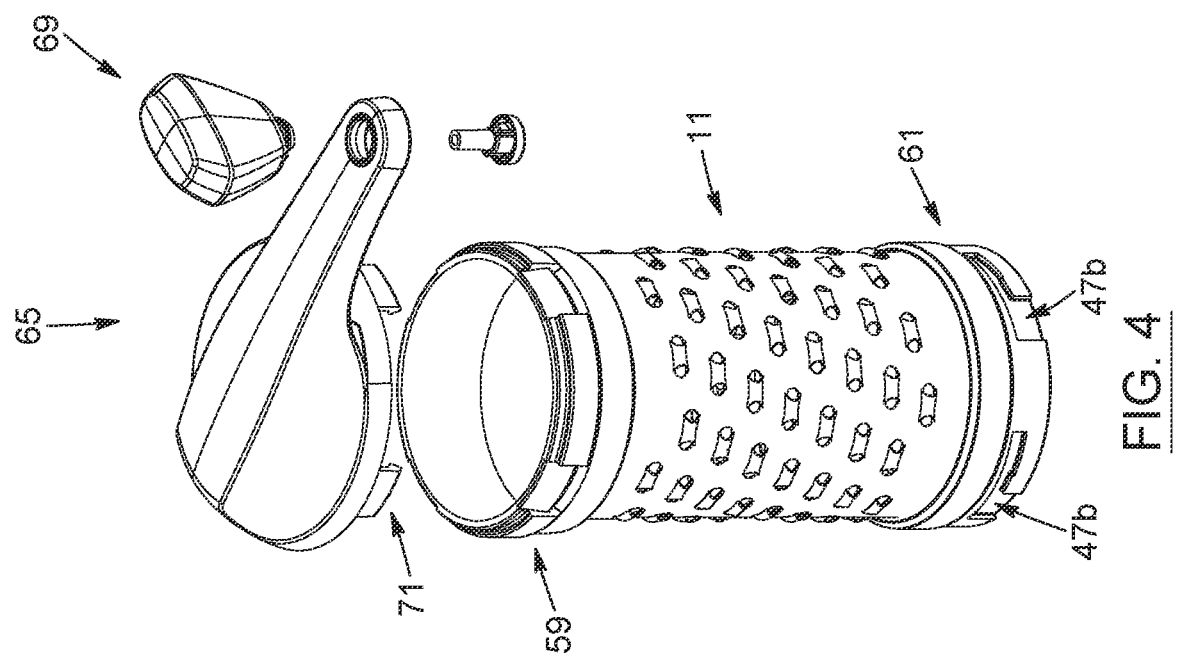
Figure 3:
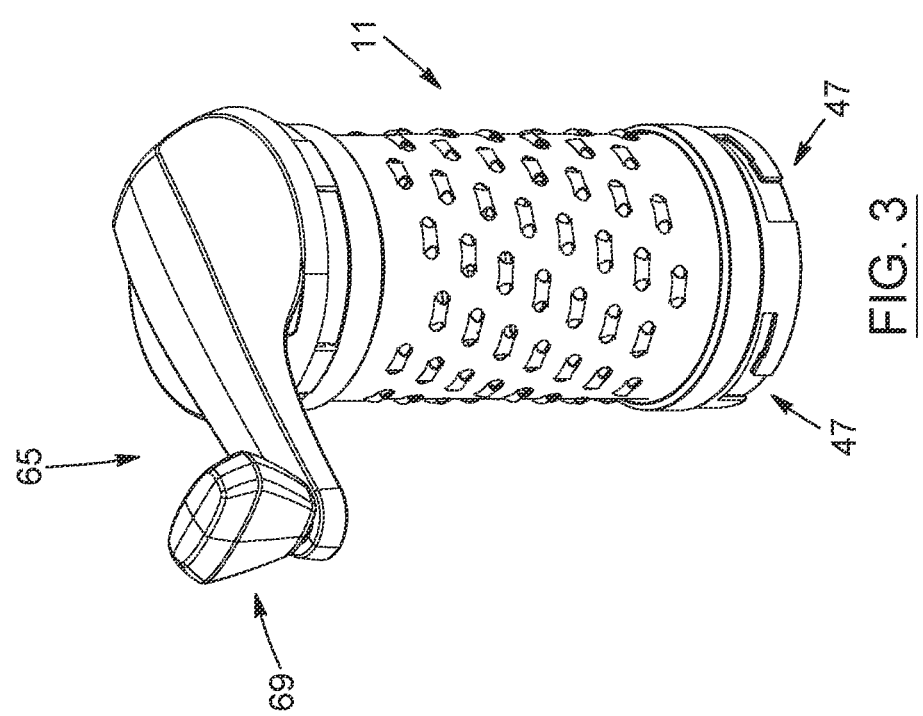
Figure 6:
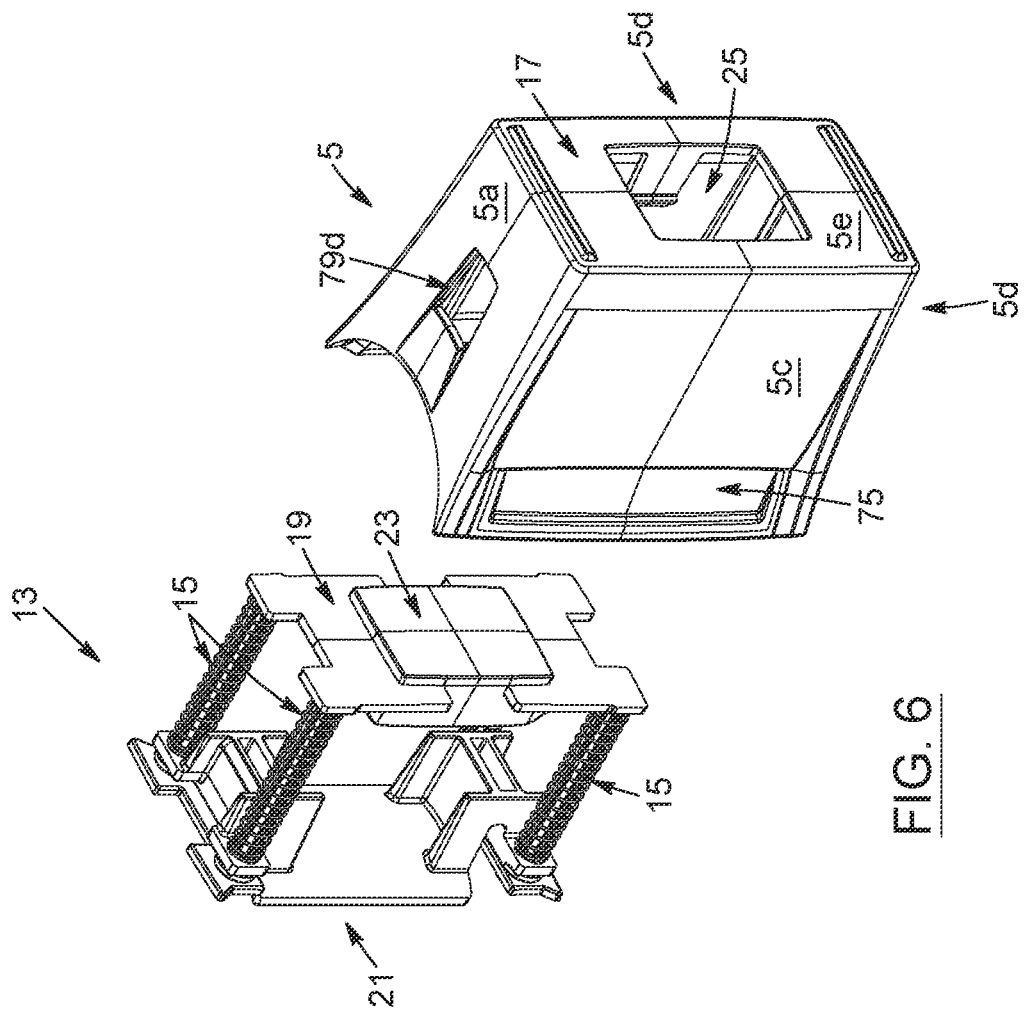
Figure 5:
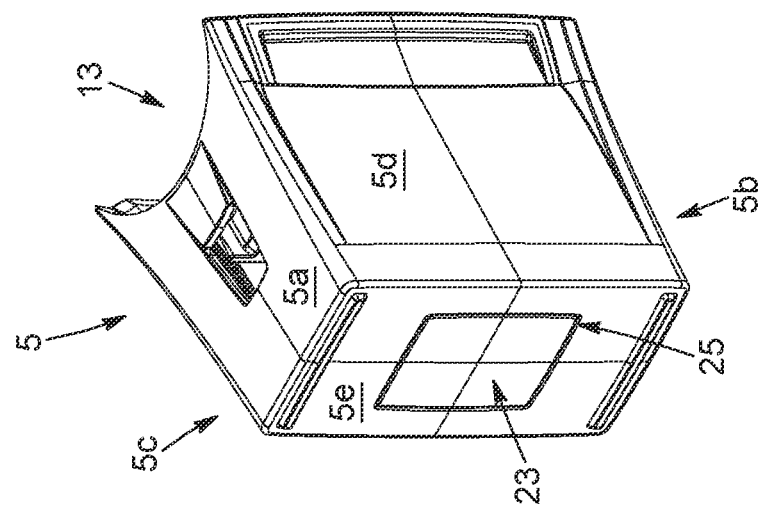
Figure 12:
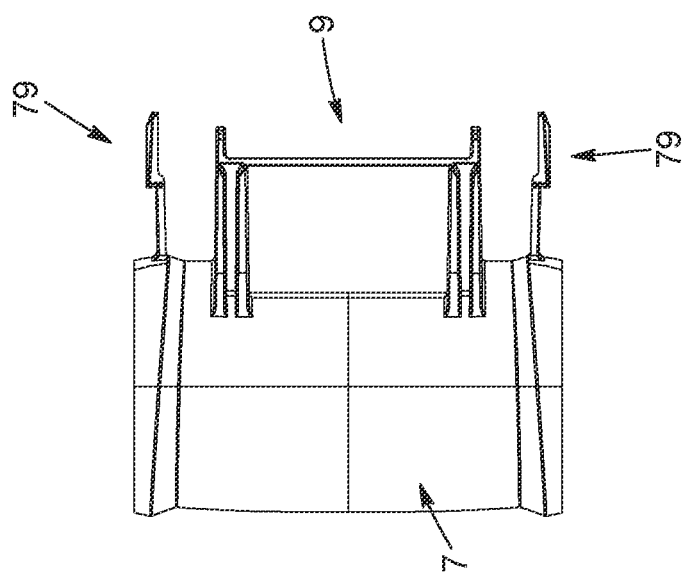
Figure 11:
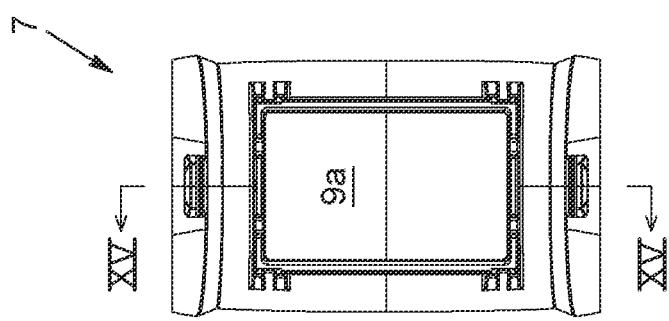
Figure 10:
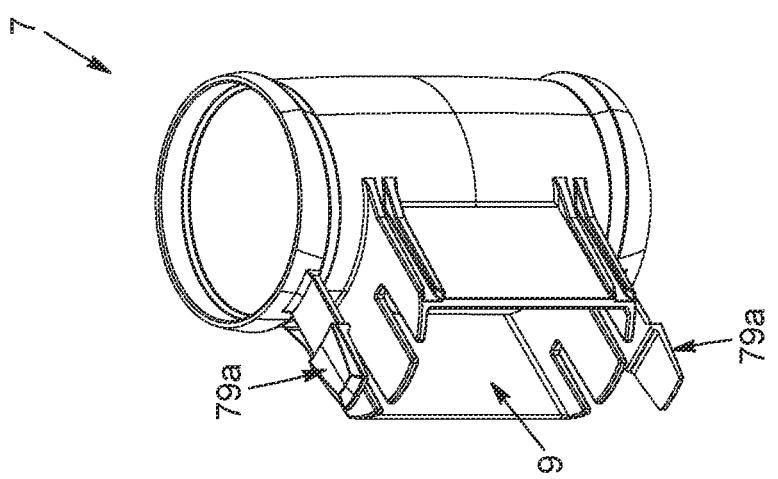
Figure 15:
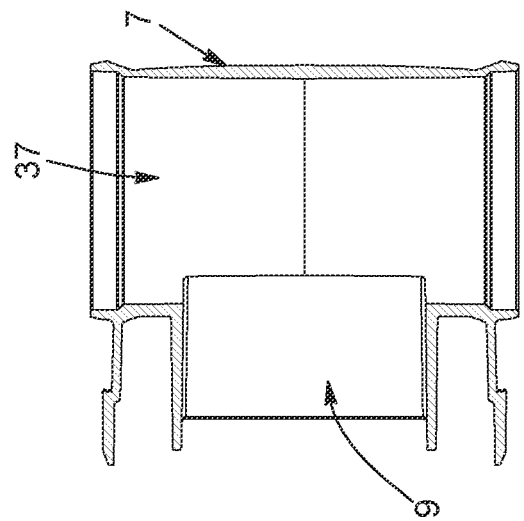
Figure 14:
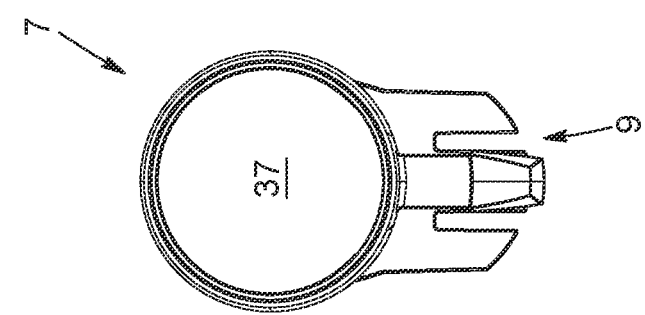
Figure 13:
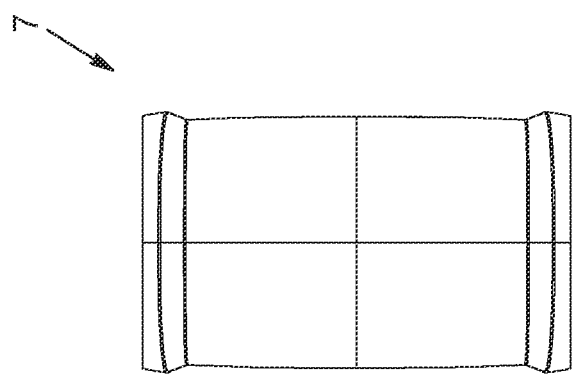
Figure 16:
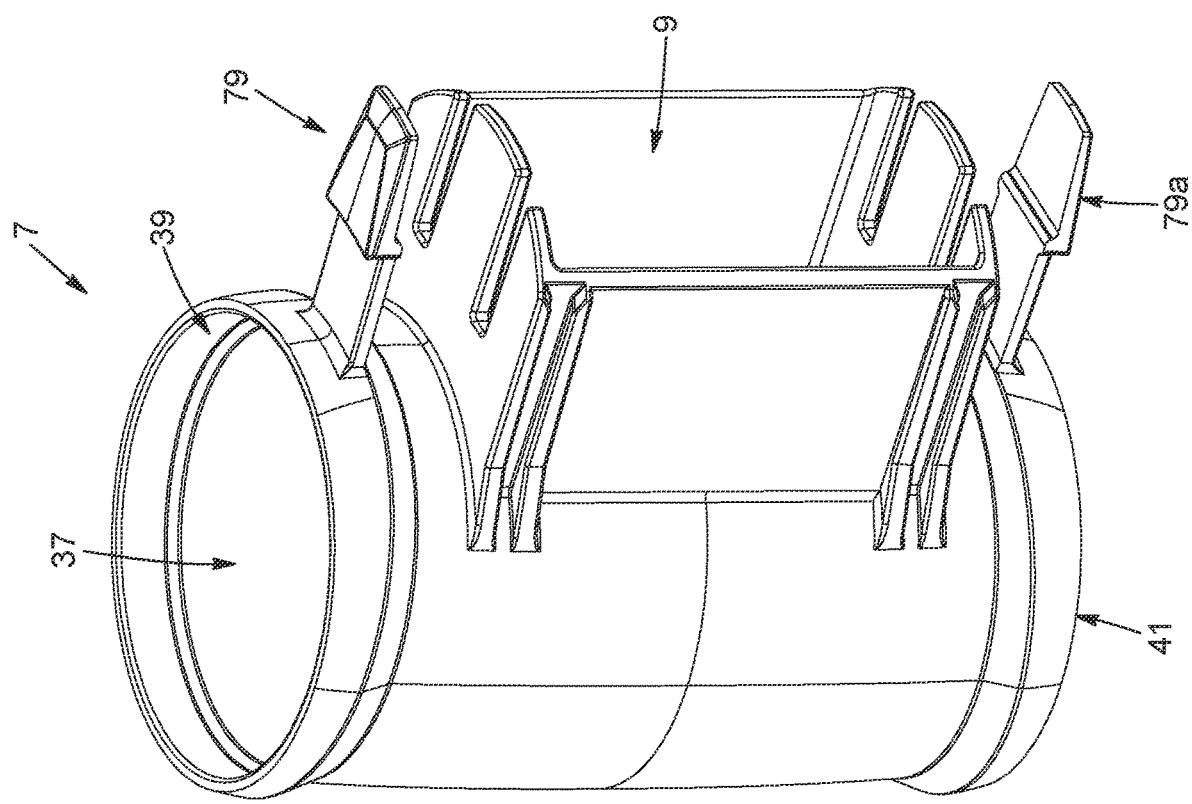
Figure 18:
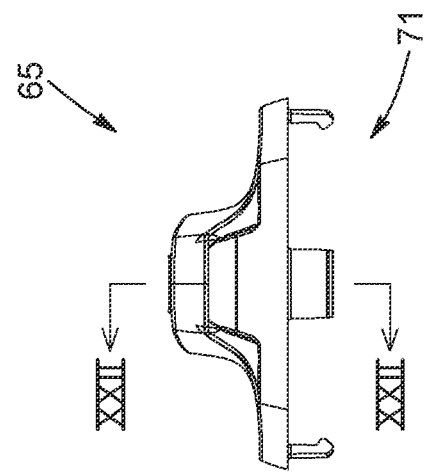
Figure 20:
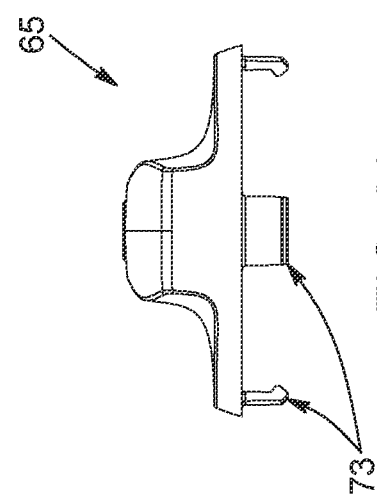
Figure 17:
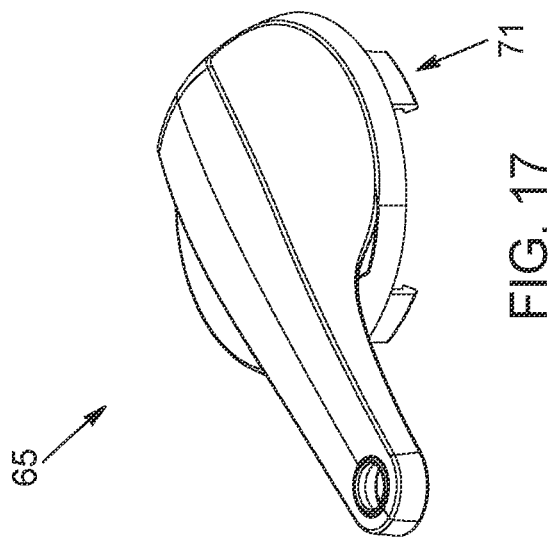
Figure 19:
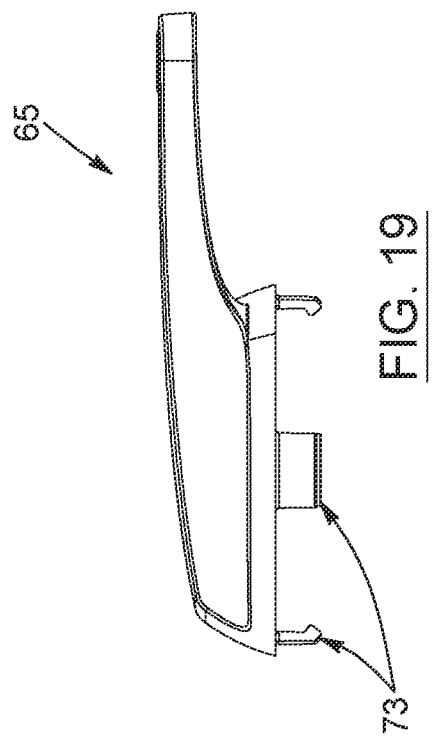
Figure 22:
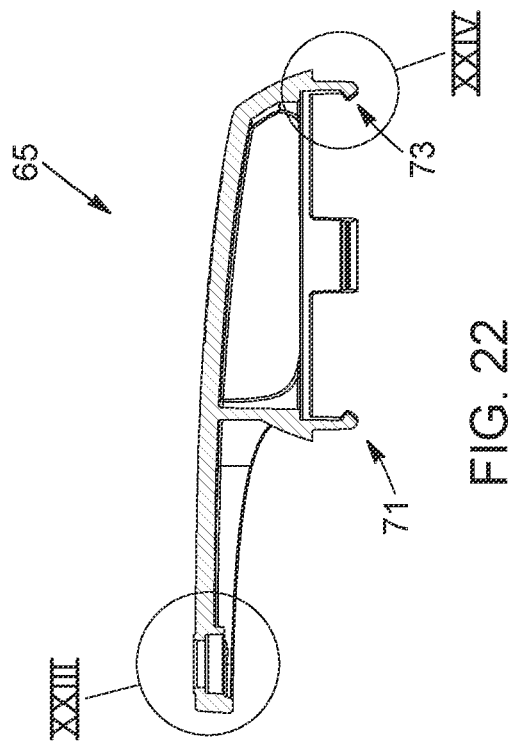
Figure 24:
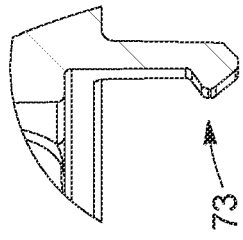
Figure 21:
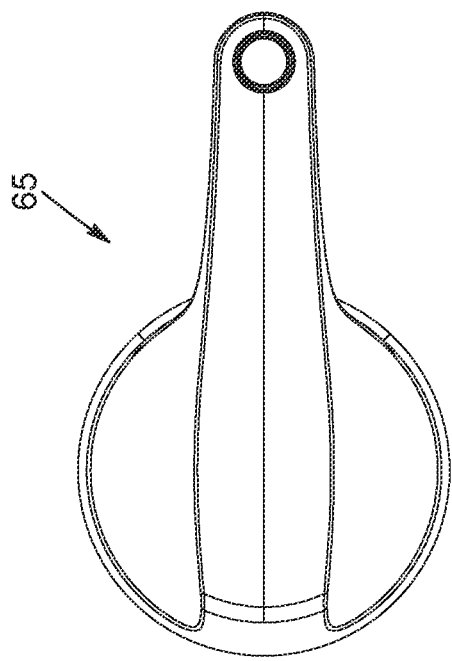
Figure 23:
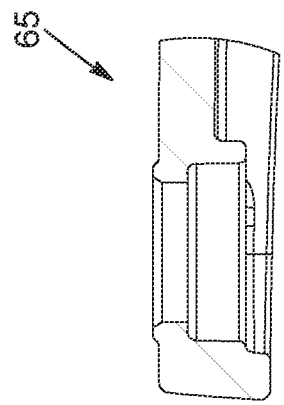
Figure 26:
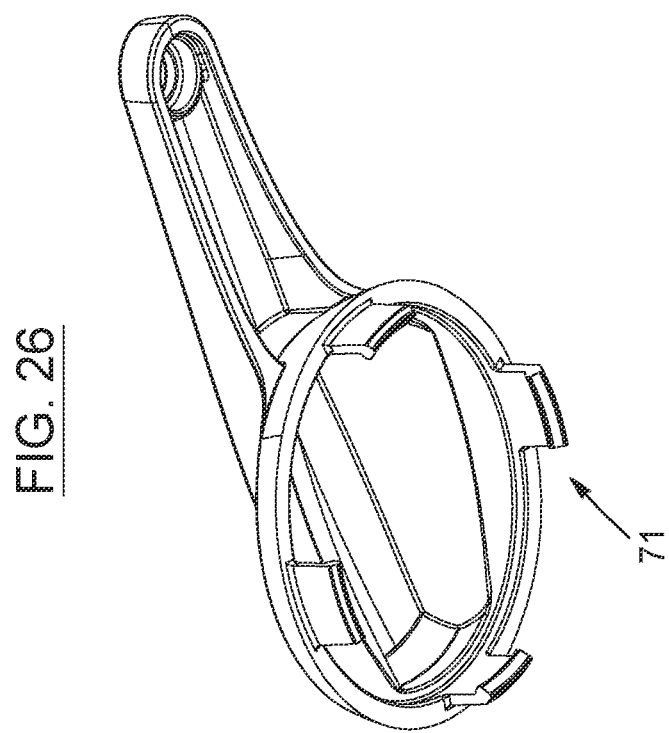
Figure 25:
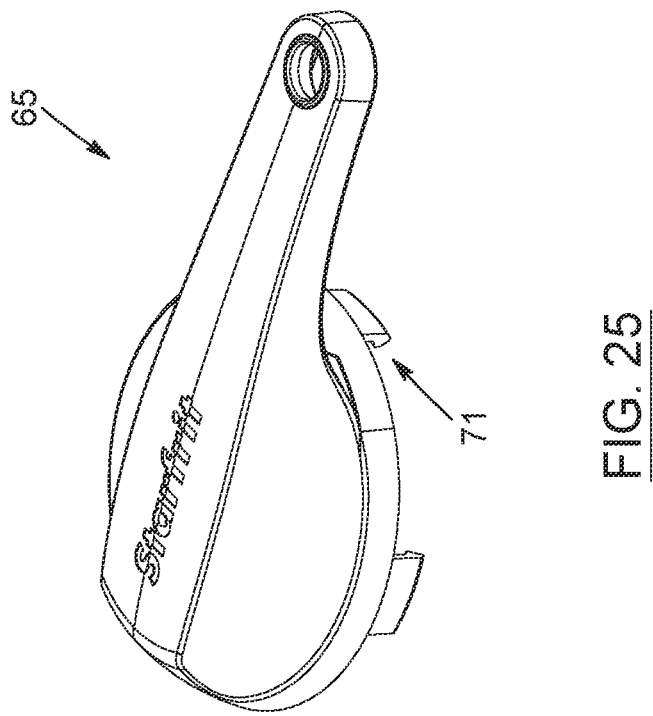
Figure 28:
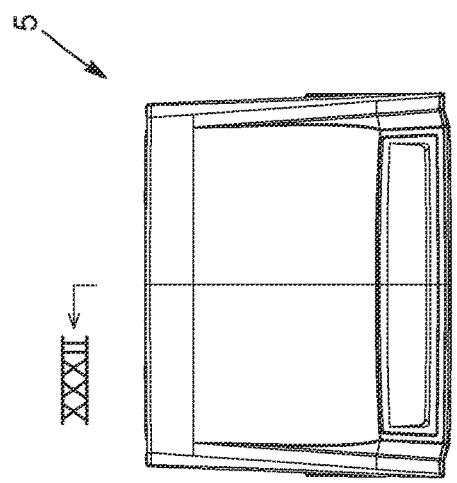
Figure 30:
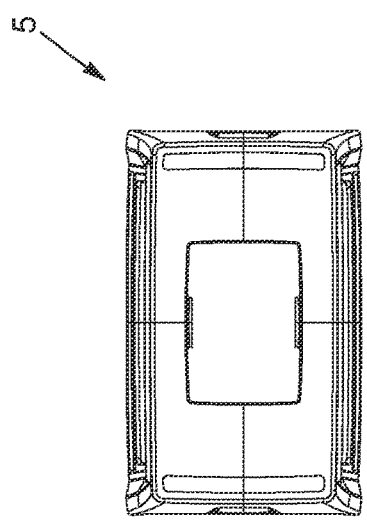
Figure 27:
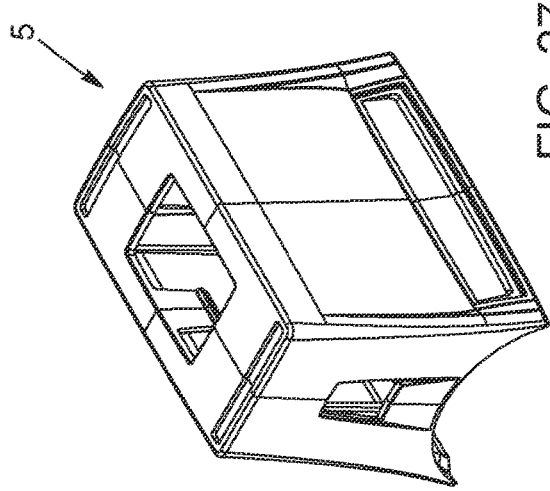
Figure 29:
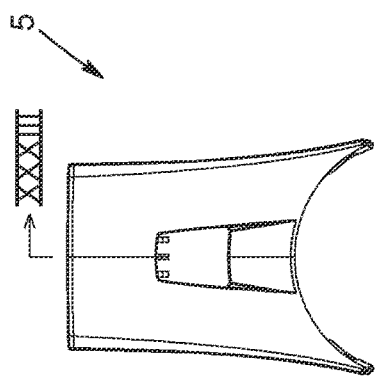
Figure 31:
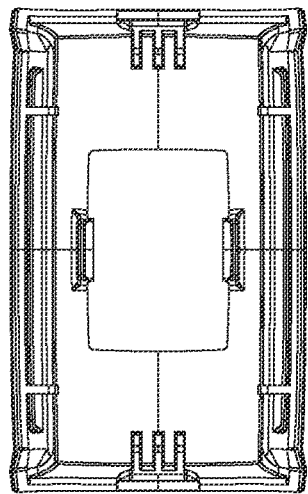
Figure 33:
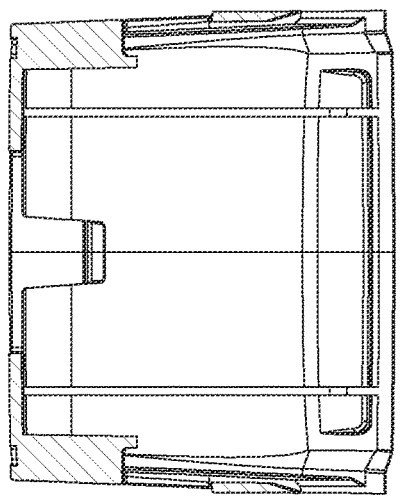
Figure 32:
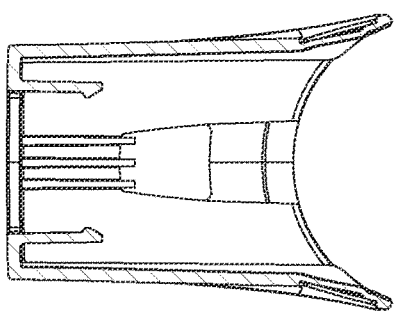
Figure 35:
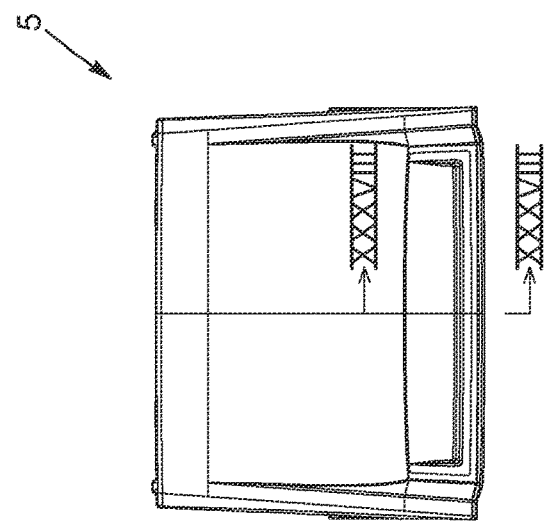
Figure 36:
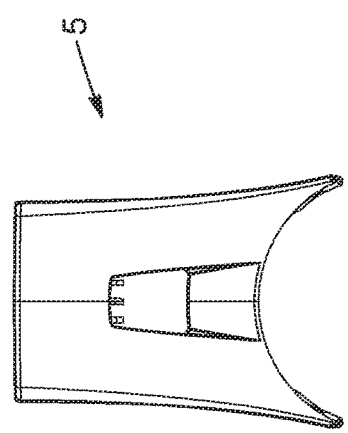
Figure 34:
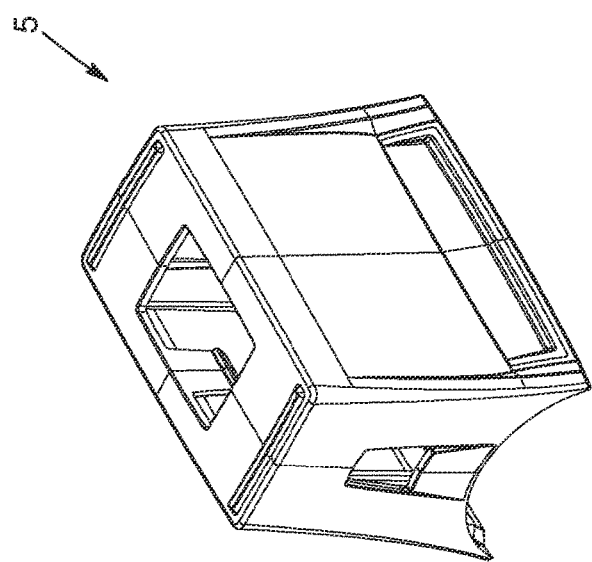
Figure 43:
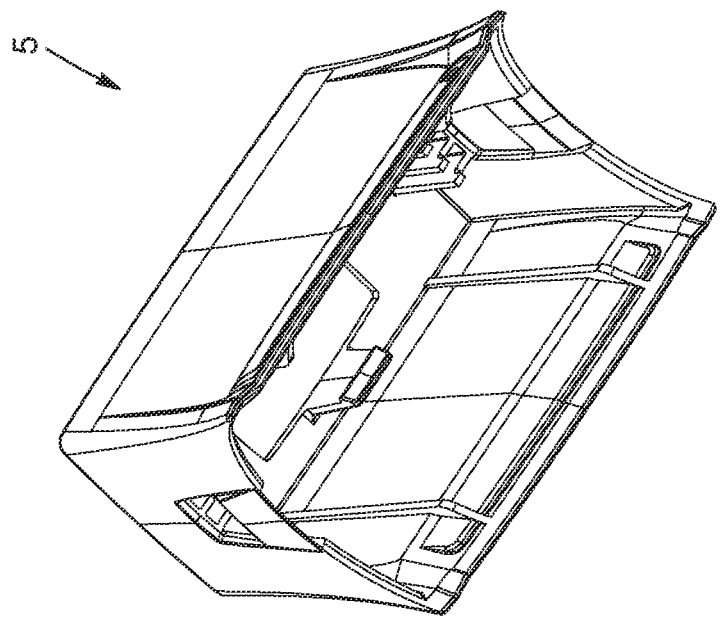
Figure 42:
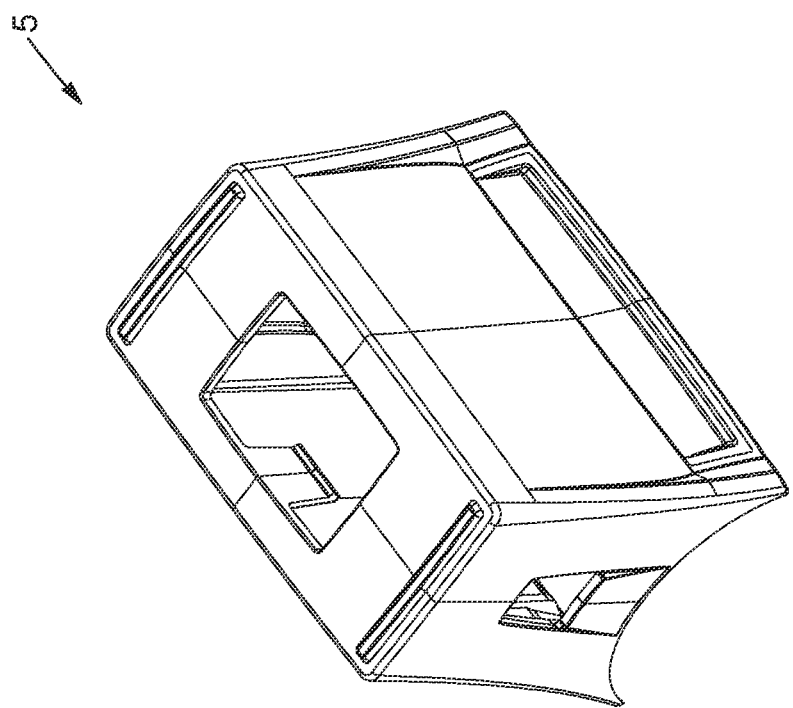
Figure 45:
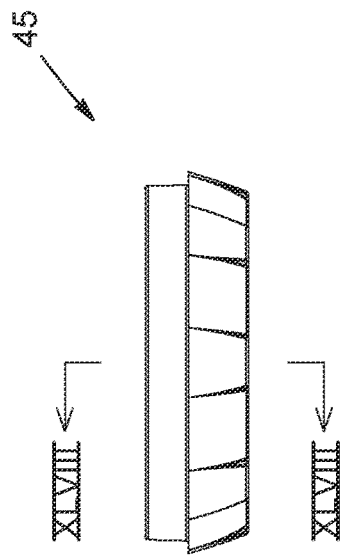
Figure 47:
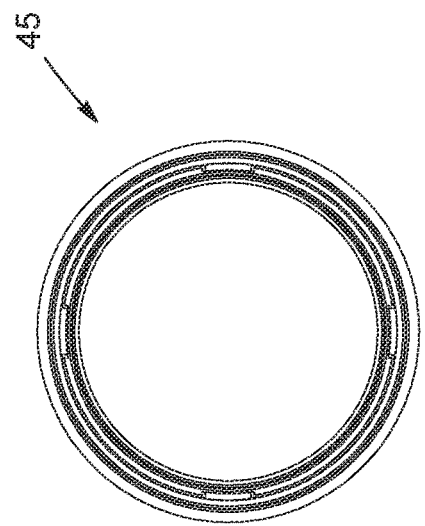
Figure 44:
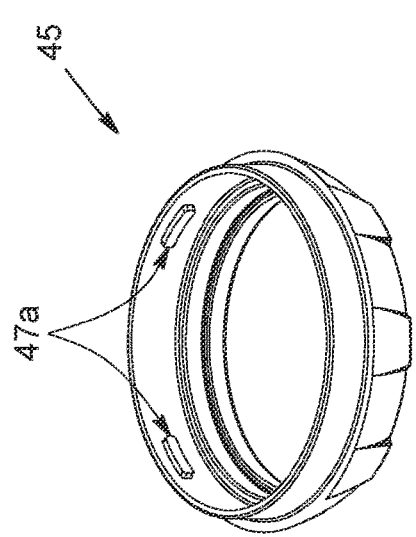
Figure 46:
Figure 49:
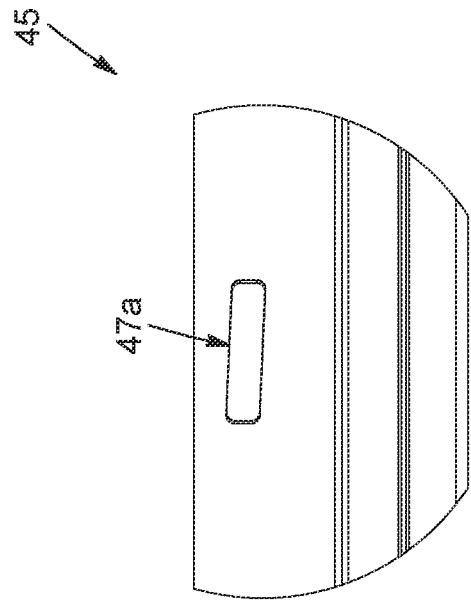
Figure 50:
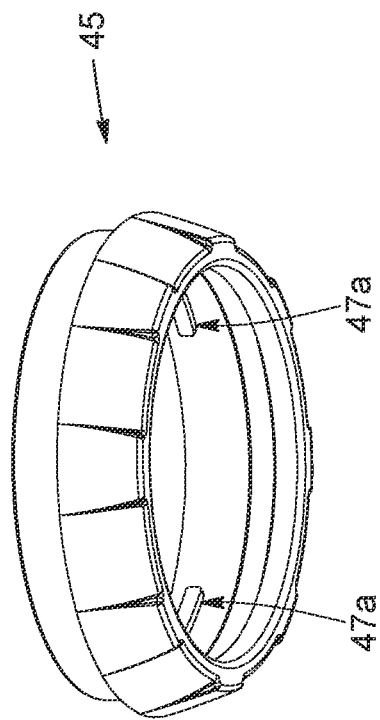
Figure 48:
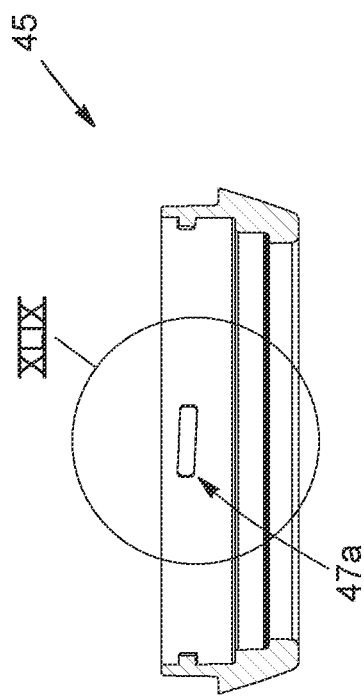
Figure 58:
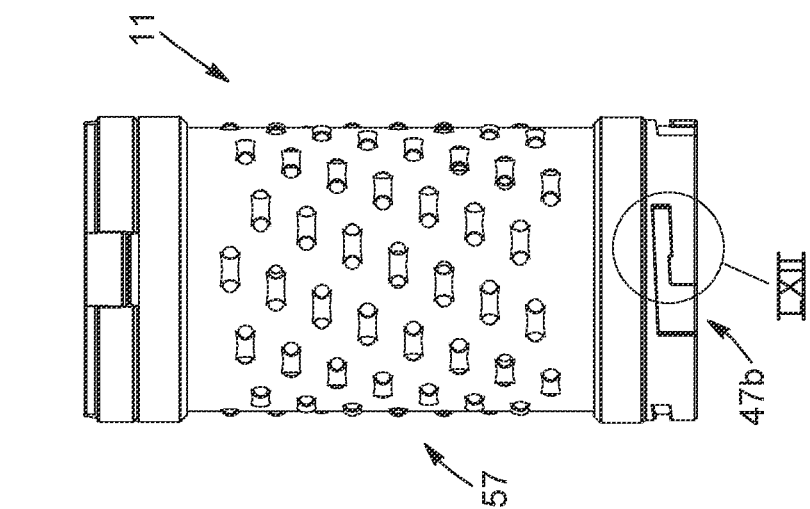
Figure 57:
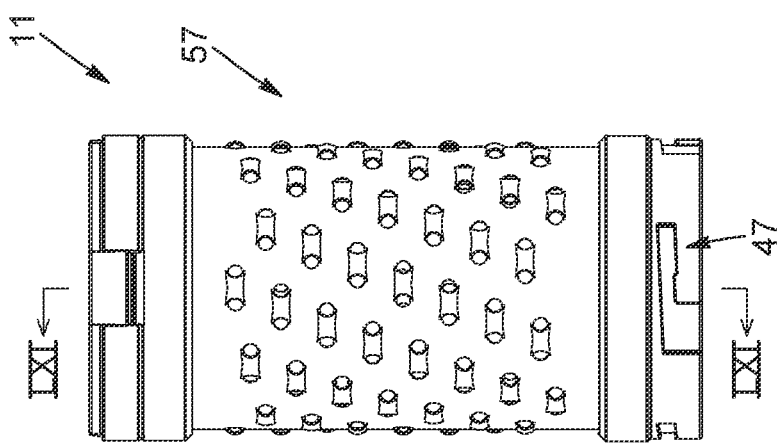
Figure 56:
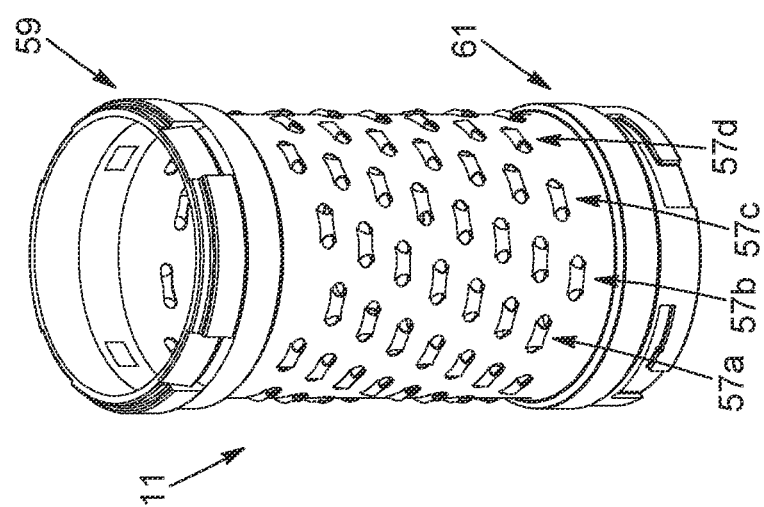
Figure 64:
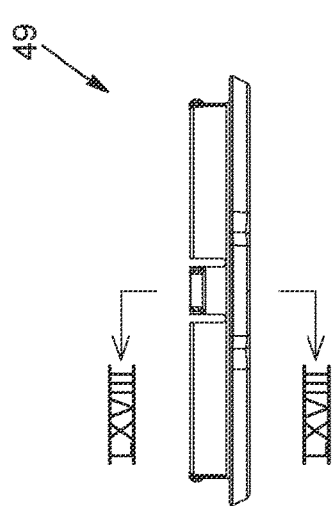
Figure 66:
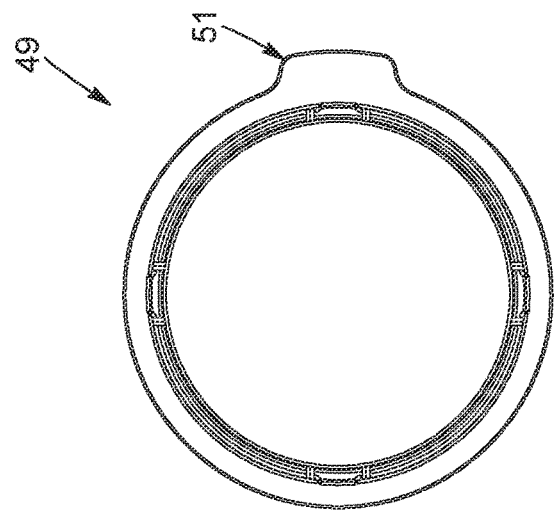
Figure 63:
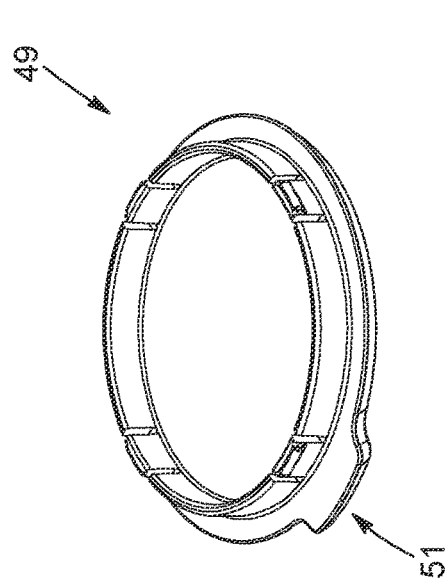
Figure 65:
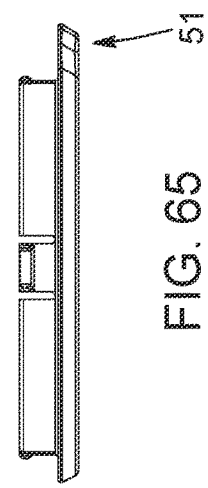
Figure 68:
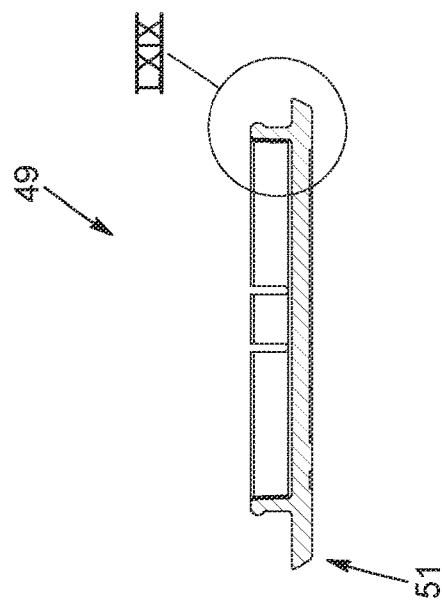
Figure 69:
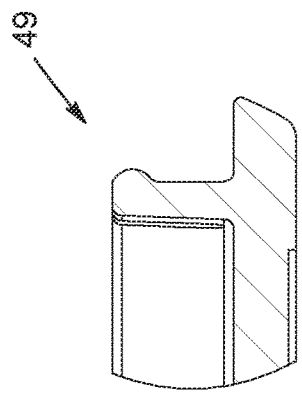
Figure 67:
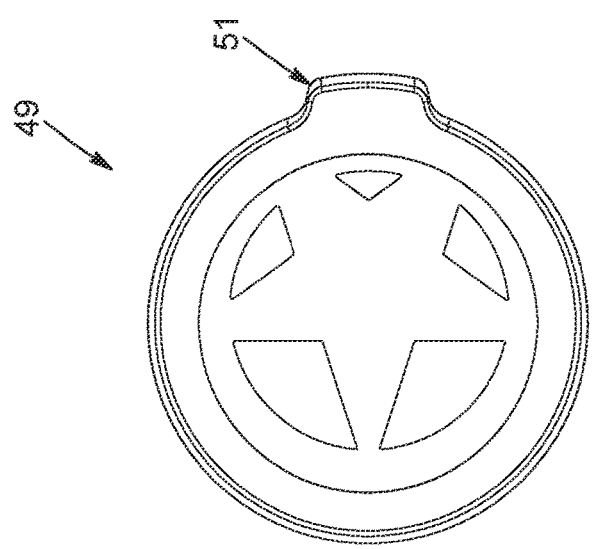
Figure 71:
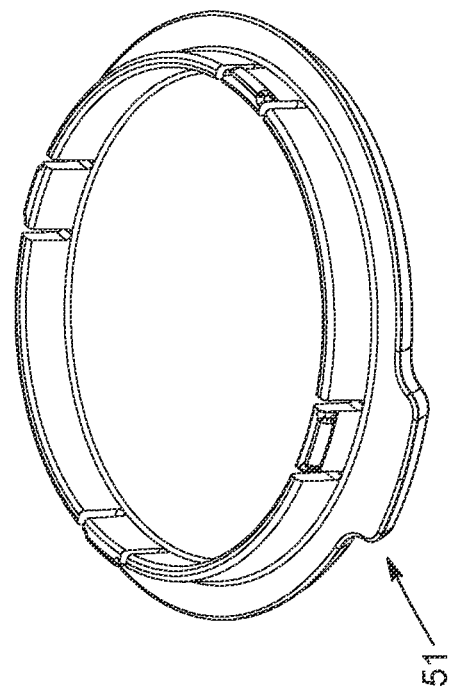
Figure 70:
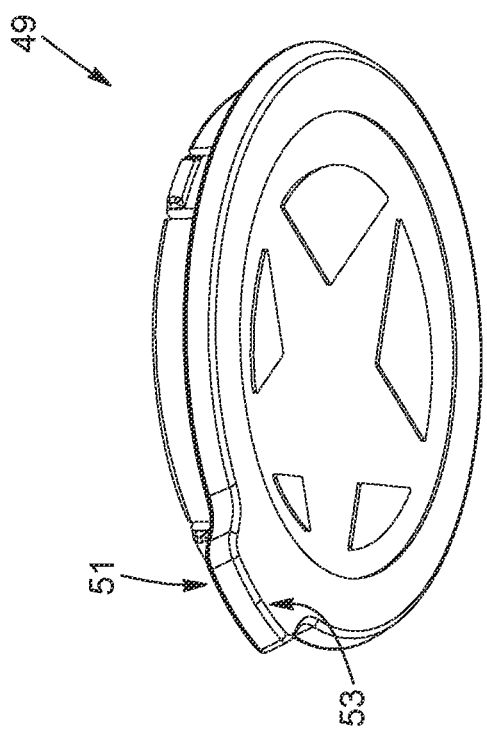
Figure 73:
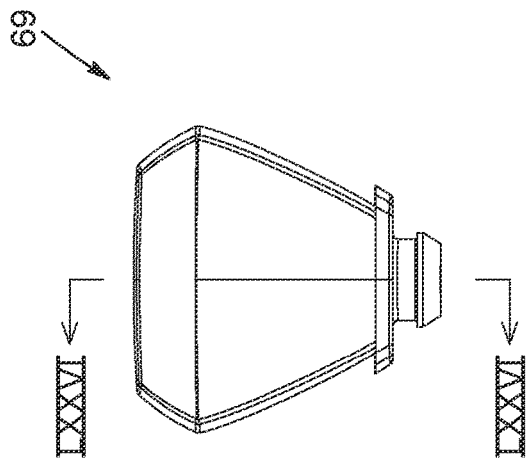
Figure 75:
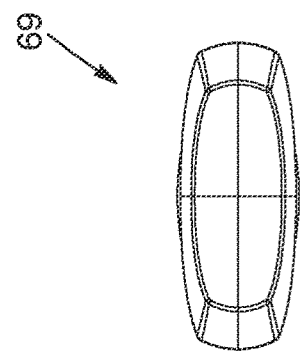
Figure 72:
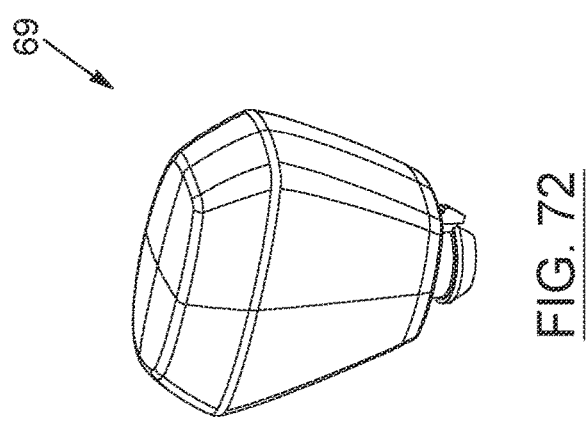
Figure 74:
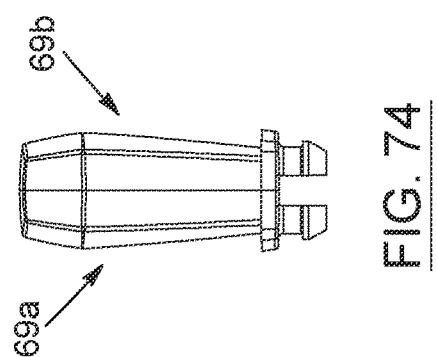
Figure 81:
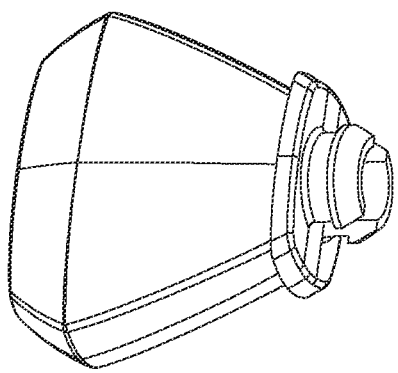
Figure 80:
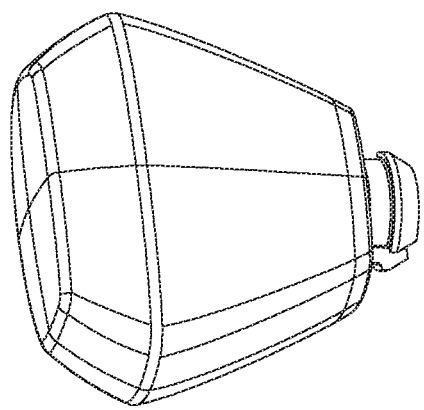
Figure 83:
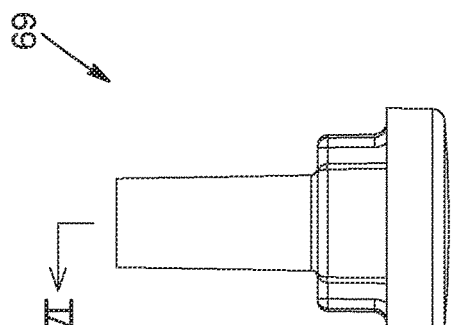
Figure 84:
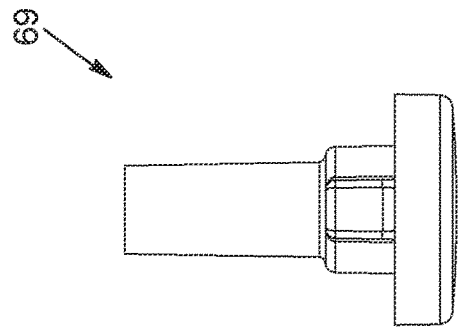
Figure 86:
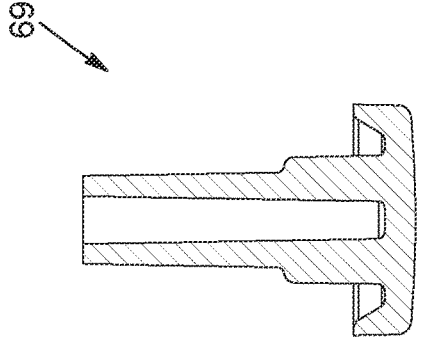
Figure 85:
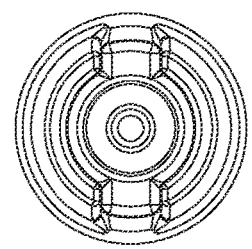
Figure 82:
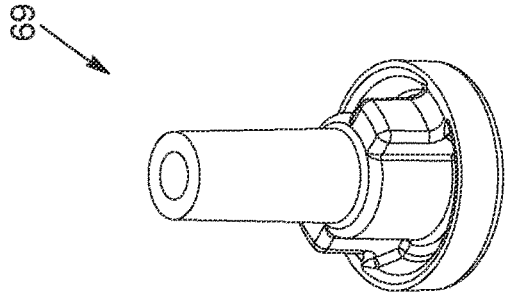
Figure 87:
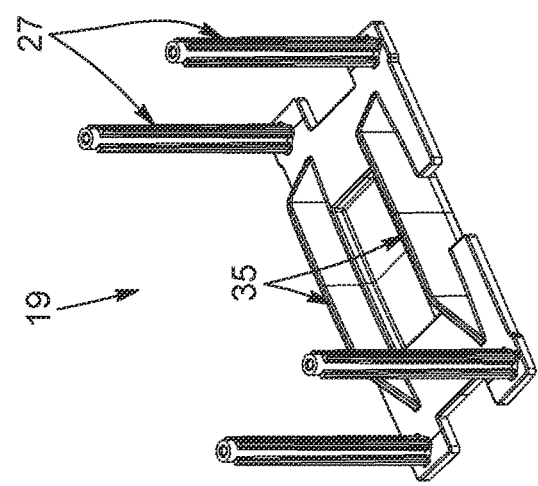
Figure 88:
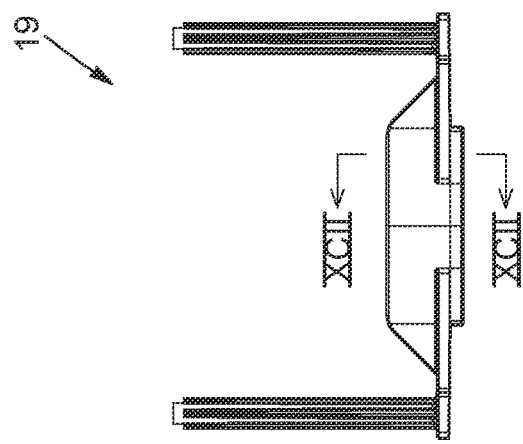
Figure 89:
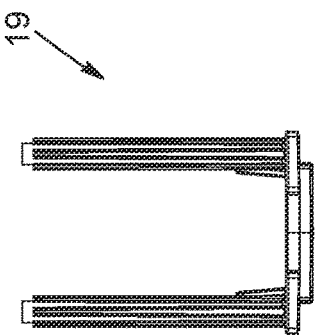
Figure 90:
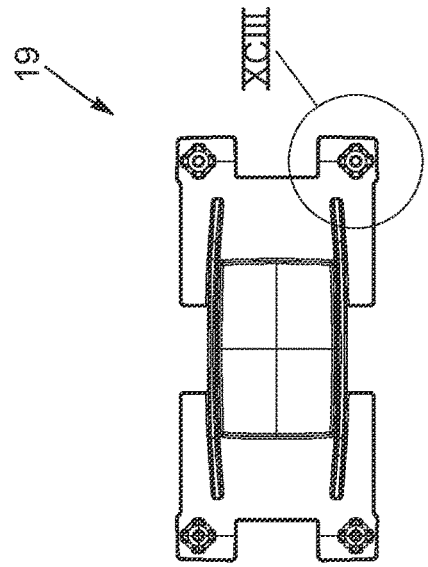
Figure 92:
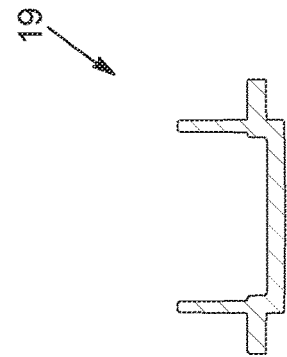
Figure 94:
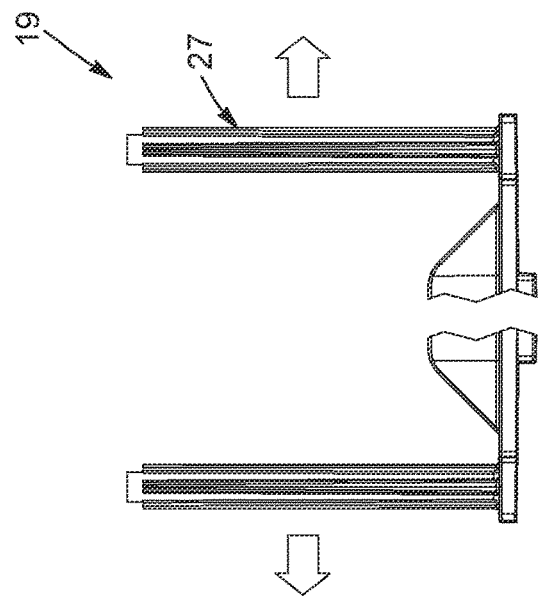
Figure 91:
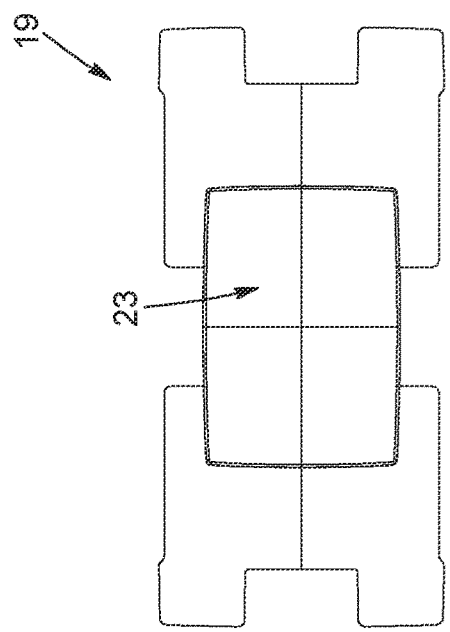
Figure 93:
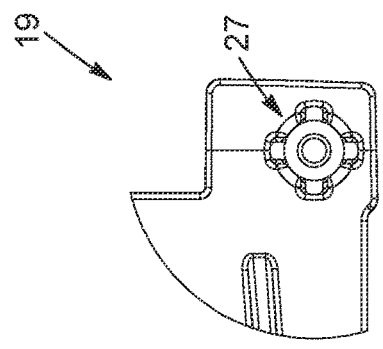
Figure 96:
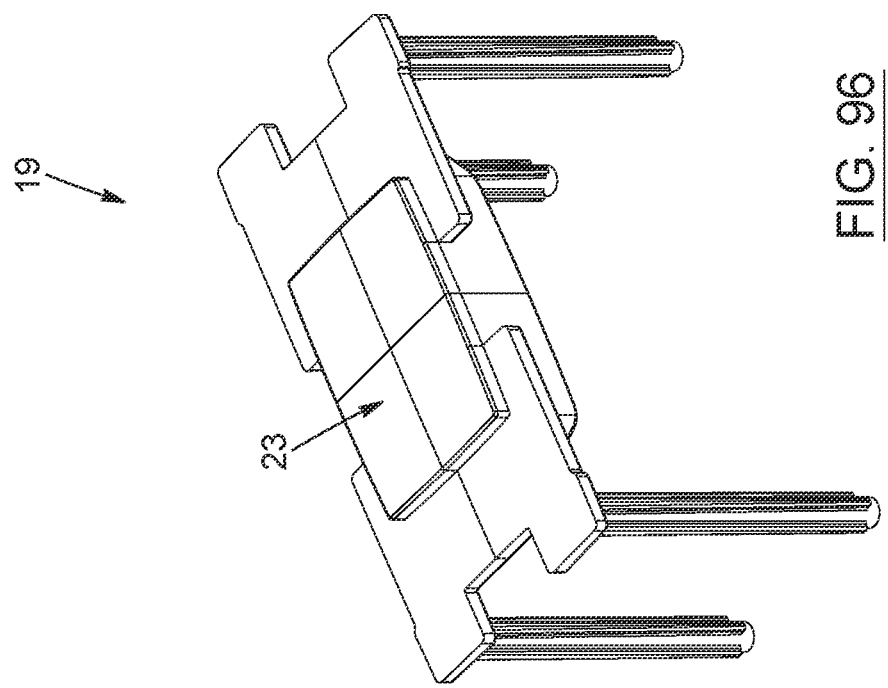
Figure 95:
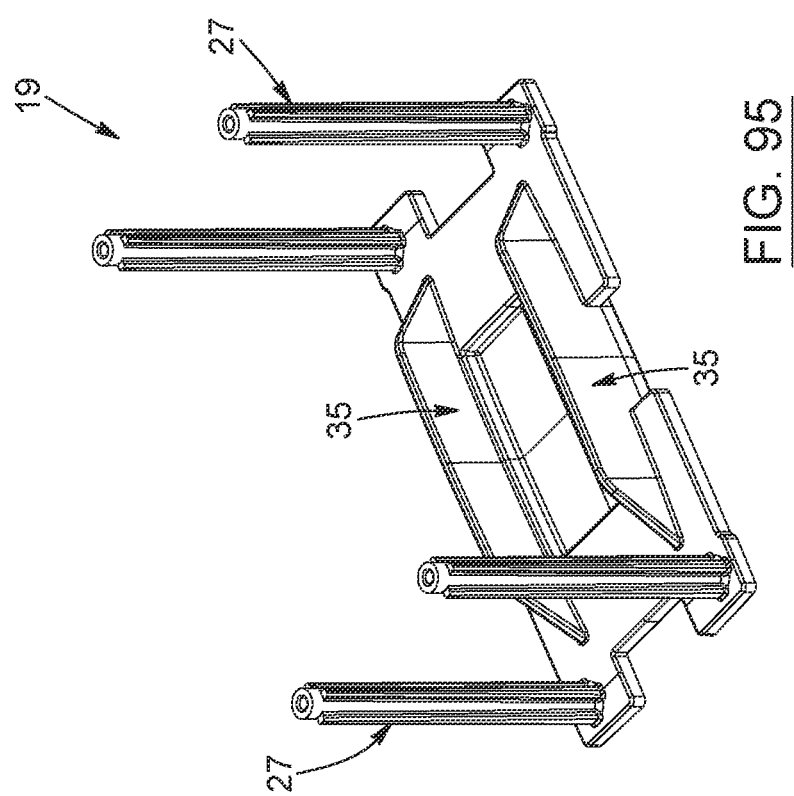
Figure 98:
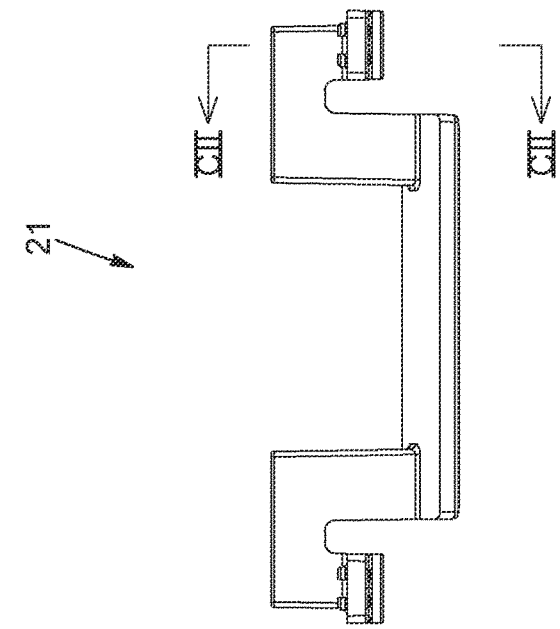
Figure 99:
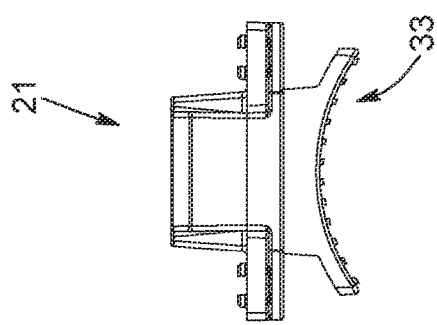
Figure 97:
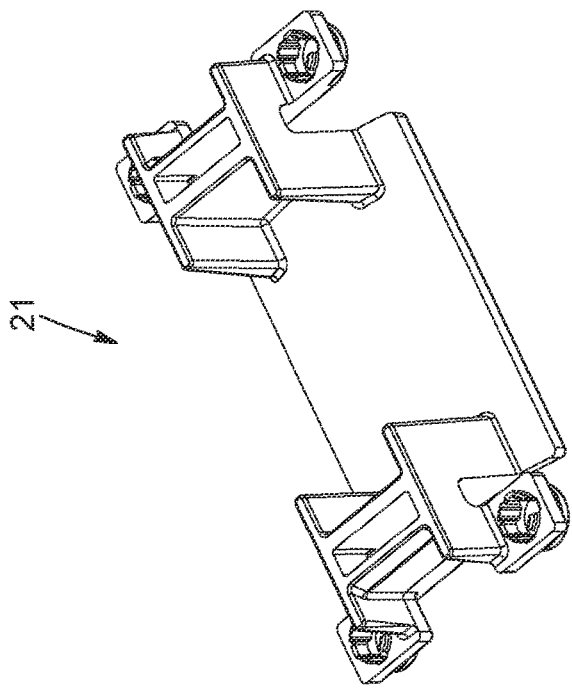
Figure 101:
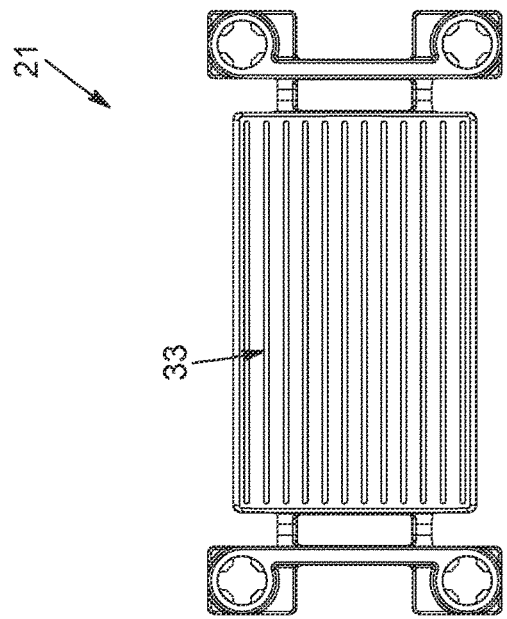
Figure 102:
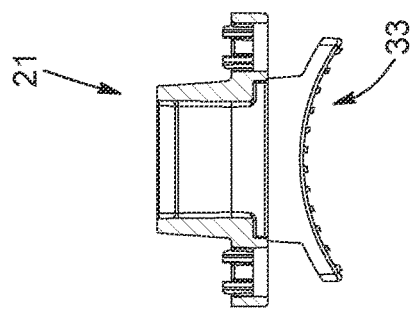
Figure 100:
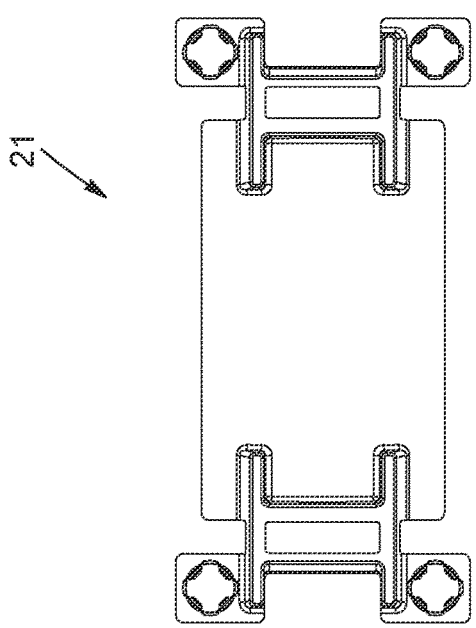
Figure 104:
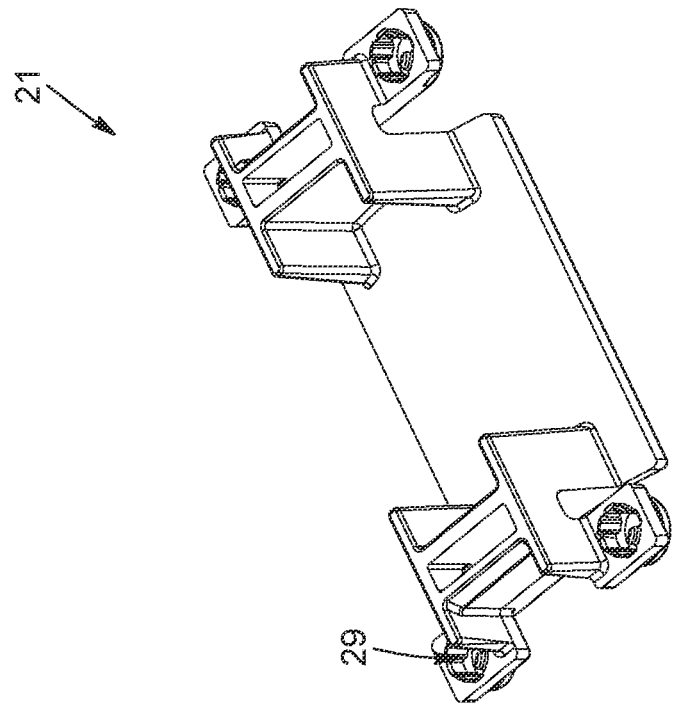
Figure 103:
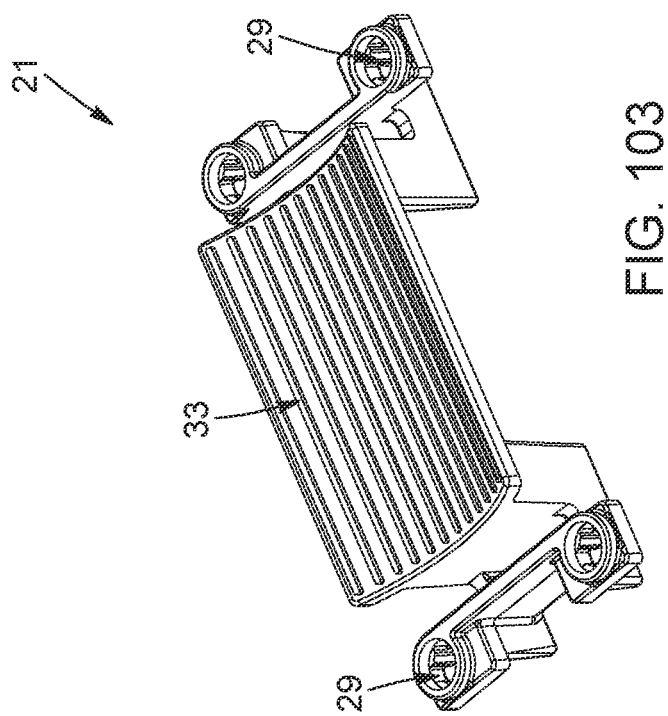
Figure 112:
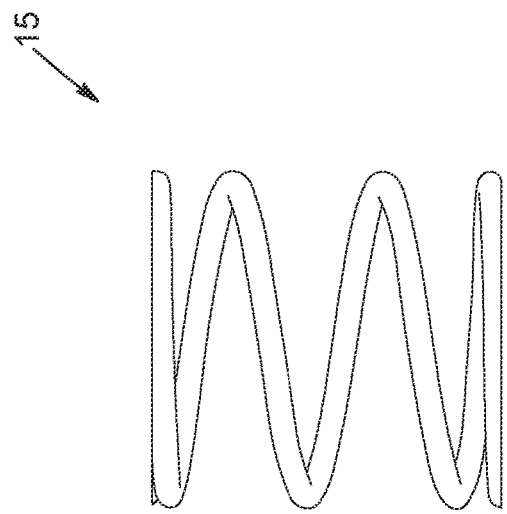
Figure 113:
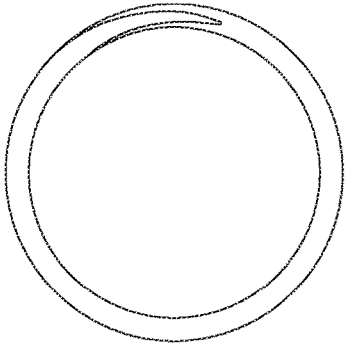
Figure 111:
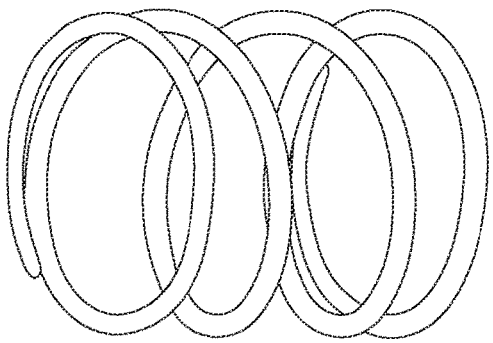

In the following description, the same numerical references refer to similar elements. Furthermore, for sake of simplicity and clarity, namely so as to not unduly burden the figures with several reference numbers, only some figures have been provided with reference numbers, and components and features of the present invention illustrated in other figures can be easily inferred therefrom. The embodiments, geometrical configurations, materials mentioned and/or dimensions (expressed in inches, for example) shown in the figures are preferred, for exemplification purposes only.

Moreover, although the present invention was primarily designed as a grater for grating purposes (i.e. "cut", "remove", "detach", "scrape", etc.) a gratable material, such as a cheese, chocolate and/or the like (for example), it may be used with other types of objects, and in other fields, as apparent to a person skilled in the art. For this reason, expressions such as "grater", "grating", "cheese", "chocolate", etc., used herein should not be taken as to limit the scope of the present invention and includes all other kinds of objects or fields with which the present invention could be used and may be useful, as apparent to a person skilled in the art.

Moreover, in the context of the present invention, the expressions "grater", "device", "product", "system", "station", "machine", "equipment", "method", "kit", and "assembly", as well as any other equivalent expression(s) and/or compound(s) word thereof known in the art will be used interchangeably, as apparent to a person skilled in the art. This applies also for any other mutually equivalent expressions, such as, for example: a) "producing", "manufacturing", "cutting", "processing", "altering", "modifying", "changing", etc.; b) "grating", "cutting", "removing", "detaching", "separating", "scraping", etc.; as well as for any other mutually equivalent expressions, pertaining to the aforementioned expressions and/or to any other structural and/or functional aspects of the present invention, as also apparent to a person skilled in the art. Also, in the context of the present description, expressions such as "can", "may", "might", "will", "could", "should", "would", etc., may also be used interchangeably, whenever appropriate, as also apparent to a person skilled in the art.

Furthermore, in the context of the present description, it will be considered that all elongated objects will have an implicit "longitudinal axis" or "centerline", such as the longitudinal axis of a shaft, or the centerline of a hole, for example (and as a result, there is a "transversal axis" being substantially "perpendicular" for each longitudinal axis, etc.), and that expressions such as "connected" and "connectable", or "mounted" and "mountable", may be interchangeable, in that the present invention also relates to a kit with corresponding components for assembling a resulting fully assembled and operational grating device (and/or simply "grater") for grating purposes and/or the like, such as with cheese, for example.

Moreover, components of the machine(s) and/or steps of the method(s) described herein could be modified, simplified, altered, omitted and/or interchanged, without departing from the scope of the present invention, depending on the particular applications which the present invention is intended for, and the desired end results, as briefly exemplified herein and as also apparent to a person skilled in the art.

In addition, although the preferred embodiment of the present invention as illustrated in the accompanying drawings may comprise various components, and although the preferred embodiments of the grating device and/or associated method(s) (ex. of assembling, operating, use, etc.) may consist of certain preferred steps and components as explained herein, not all of these steps and components are essential to the invention and thus should not be taken in their restrictive sense, i.e. should not be taken as to limit the scope of the present invention. It is to be understood, as also apparent to a person skilled in the art, that other suitable steps, components and cooperation therebetween, may be used for the present method and corresponding grating device (as well as corresponding components) according to the present invention, as will be briefly explained hereinafter and as can be easily inferred herefrom by a person skilled in the art, without departing from the scope of the invention.

LIST OF NUMERICAL REFERENCES FOR SOME OF THE CORRESPONDING POSSIBLE COMPONENTS ILLUSTRATED IN THE ACCOMPANYING DRAWINGS 1. grating device
3. product to be grated (ex. cheese, chocolate, etc.)
5. first housing (of grating device)
5a. first end side wall (of first housing)
5b. second end side wall (of first housing)
5c. first longitudinal side wall (of first housing)
5d. second longitudinal side wall (of first housing)
7. second housing (of grating device)
9. loading section (of second housing)
11. grating drum (of grating device)
11a. first rim (of grating drum)
11b. second rim (of grating drum)
13. biasing assembly (of grating device)
15. spring (of biasing assembly)
15a. first extremity (of spring)
15b. second extremity (of spring)
17. wall (of first housing)
19. first pushing component
21. second pushing component
23. protruding section (of first pushing component)
25. cavity (provided about the wall)
27. guiding post (for spring)
27a. first end (of guiding post)
27b. second end (of guiding post)
27c. elongated body (of guiding post)
29. bore (of second pushing component)
31. closing plate
33. supporting surface (of second pushing component)
35. stopping flange (of first pushing component)
37. recess (defined within the second housing)
39. first opening (of second housing)
41. second opening (of second housing)
43. distal rim (of grating drum)
45. securing ring
47. interlocking mechanism (for securing ring and grating drum)
47a. male component (of interlocking mechanism)
47b. female component (of interlocking mechanism)
47c. first insertion portion (of female component of interlocking mechanism)
47d. second abutment portion (of female component of interlocking mechanism)
49. cap (of grating device)
51. handling tab (of cap)
53. finger-receiving rib (of handling tab)
55. grating element (of grating drum)
55a. first grating cavity (of grating element)
55b. second grating cavity (of grating element)
55c. grating body (of grating element)
55d. cutting edge (of grating element)
57. row (of grating elements)
57a. first slanted row (of grating elements)
57b. second slanted row (of grating elements)
57c. third slanted row (of grating elements)
57d. fourth slanted row (of grating elements)
59. covering insert (of first rim of grating drum)

61. covering insert (of second rim of grating drum)
63. indent (of rim for receiving covering insert)
65. handle (for rotating grating drum)
67. securing component (of grating drum)
69. knob (of handle)
69a. first flattened side (of knob)
69b. second flattened side (of knob)
71. connection mechanism (for connecting handle to covering insert)
73. clip (of connection mechanism)
75. finger-receiving section (of longitudinal side wall)
77. anti-skidding pad
79. interlocking assembly (for interlocking first and second housings)
79a. male component (of interlocking assembly)
79b. female component (of interlocking assembly)
79c. tab (of interlocking assembly)
79d. orifice (of interlocking assembly)

The present grating device is particularly advantageous in that, by virtue of its design, components and features, as better described and illustrated herein, it enables to grate material (ex. cheese, chocolate, etc.) more conveniently and more ergonomically. The present system also advantageously allows to grate cheese in a quicker, easier, simpler, faster, more efficient, more economical, more reliable, more adjustable, more versatile, more adjustable, more sustainable and/or more desirable manner than what is possible with other conventional graters.

The present grating device (1) may come in the form of a grating device (1) including one and/or several of the following possible components and features (and/or different possible combination(s) and/or permutation(s) thereof):

For example, and according to one possible embodiment of the present system, as can be easily understood when referring to the accompanying drawings, for example, there is provided a grating device (1) for grating a substantially solid product (3) capable of being grated, the grating device (1) comprising: a) a first housing (5) being positioned, shaped and sized for encasing the product (3) to be grated; b) a second housing (7) operatively connectable to the first housing (5), the second housing (7) having a loading section (9) being configured for receiving the product (3) to be grated; c) a grating drum (11) rotatably mountable about the second housing (7), and being positioned, shaped and sized for grating the product (3) from the loading section (9) of the second housing (7) via a rotation of the grating drum (11) against said product (3); and d) a biasing assembly (13) operatively cooperable with the first housing (5) for biasing the product (3) to be grated inside the loading section (9) of the second housing (7) towards and against the grating drum (11).

The biasing assembly (13) may include at least one spring (15) operatively extendable between a given wall (17) (ex. a bottom wall) of the first housing (5) and the product (3) to be grated, for urging the product (3) to be grated towards and against the grating drum (11).

According to a possible embodiment, a first extremity (15a) of the at least one spring (15) may be operatively connectable to a first pushing component (19) configured for operatively pushing against the given wall (17) (ex. a bottom wall) of the first housing (5), and a second extremity (15b) of the at least one spring (15) may be operatively connectable to a second pushing component (21) configured for operatively pushing against the product (3) to be grated.

Optionally, the first pushing component (19) is provided with a protruding section (23) being removably insertable into a corresponding cavity (25) provided about the given wall (17) (ex. a bottom wall) of the first housing (5). The corresponding cavity (25) provided about the given wall (17) (ex. a bottom wall) of the first housing (5) may be a through-hole cavity, and the protruding section (23) of the first pushing component (19) may have a rectangular profile, for example, and thus, the corresponding cavity (25) provided about the given wall (17) (ex. a bottom wall) of the first housing (5) may have a complementary rectangular profile.

The at least one spring (15) may include at least one pair of springs (15), with the springs (15) being provided about opposite sides of a same pushing component, for example. Alternatively, the least one spring (15) may also include two pairs of springs (15), with each pair of springs (15) being provided about a corresponding opposite distal side of the same pushing component, for example.

According to a possible embodiment, each spring (15) can be disposed about a corresponding guiding post (27) operatively projecting from the same pushing component, and each guiding post (27) may have an elongated body (27c) extending between first and second ends (27a,27b), said elongated body (27c) being shaped, positioned and sized for allowing an operative pushing component of the grating device (1) to travel therealong, the first end (27a) of the guiding post (27) being securely affixed to a first pushing component (19), and the second end (27b) of the guiding post (27) being configured for preventing egress of the second pushing component (21) from the guiding post (27).

Optionally also, each guiding post (27) may be slidably insertable into a corresponding bore (29) of the second pushing component (21) for allowing the second pushing component (21) to travel freely along the elongated body (27c) of the guiding post (27), and the second end (27b) of each guiding post (27) may be configured to be capped with a corresponding closing plate (31) for preventing egress of the second pushing component (21) from the guiding post (27).

According to a possible embodiment, each bore (29) of the second pushing component (21) may be positioned downwardly with respect to a corresponding supporting surface (33) of the second pushing component (21) intended to support the product (3) to be grated.

Optionally also, each guiding post (27) can have a substantially X-shaped cross-sectional profile, although various other types of profiles are possible.

According to another possible embodiment, the second end (27b) of each guiding post (27) is melted onto a corresponding receiving portion of a closing plate (31) for creating a permanent connection with the closing plate (31), although various other types of connections are also possible.

As can be easily understood when referring to the accompanying drawings, the first pushing component (19) may comprise at least one stopping flange (35) being positioned, shaped and sized for delimiting a minimal distance between the first and second pushing components (19,21) when said pushing components (19,21) are compressed towards one another. The at least one stopping flange (35) may include a pair of stopping flanges (35), each stopping flange (35) being provided about a corresponding side of the first pushing component (19). The least one stopping flange (35) may be further configured for providing the first pushing component (19) with structural rigidity. According to one possible embodiment, the least one stopping flange (35) has a substantially trapezoid-shaped profile, although various other types of profiles are possible.

As can be easily understood also, the second pushing component (21) may comprise a curved supporting surface (33) for supporting the product (3) being biased by the biasing assembly (13), and to be grated via the grating drum (11), and the curved supporting surface (33) of the second pushing component (21) may be complementary to an outer shape of the grating drum (11), for example.

According to a possible embodiment, the grating drum (11) is insertable into a corresponding recess (37) defined within the second housing (7). The second housing (7) may have first and second openings (39,41), with the grating drum (11) being insertable into the second housing (7) via the first opening (39) thereof, and a distal rim (43) of the grating drum (11) being configured to be operatively mountable and rotatable about the second opening (41) of the second housing (7). The distal rim (43) of the grating drum (11) may be further configured to be connectable with a securing ring (45) being removably mountable about the second opening (41) of the second housing (7).

Optionally, the distal rim (43) of the grating drum (11) is connectable with the securing ring (45) via an interlocking mechanism (47). According to one possible embodiment, the interlocking mechanism (47) may comprise complementary male and female components (47a,47b), at least one male component (47a) being provided about the securing ring (45), and at least one corresponding female (47b) component being provided about the distal rim (43) of the grating drum (11), and the at least one corresponding female (47b) component may be L-shaped, including a first insertion portion (47c) and a second abutment portion (47d), for example.

As can be easily understood when referring to the accompanying drawings, the second opening (41) of the second housing (7) may be further configured for releasing product having been grated by the grating device (1), and the securing ring (45) may be coaxially mounted with respect to the second opening (41) of the second housing (7), thereby allowing grated product to exit through the securing ring (45) and corresponding second opening (41) of the second housing (7), for example.

As also shown, the grating device (1) may include a cap (49) being operatively mountable onto the second opening (41) of the second housing (7) for selectively closing said second opening (41) of the second housing (7) and thus preventing product having been grated from being released. The cap (49) may be removably mountable onto the securing ring (45), and is positioned, shaped and sized for selectively closing said second opening (41) of the second housing (7). The cap (49) may also be provided with a handling tab (51) for facilitating handling (ex. removal) of the cap (49) from the second housing (7) (and/or from the securing ring (45)). The handling tab (51) of the cap (49) could also be provided with at least one finger-receiving rib (53), for example.

As can also be easily understood when referring to the accompanying drawings, the grating drum (11) may comprise a cylindrical grating surface provided with a plurality of grating elements (55). Each grating element (55) may comprise a grating body (55c) protruding from a main body of the grating drum (11) and having at least one grating cavity (55a,55b) for allowing the product (3) to be grated via a driving of the grating drum (11) along a given direction of rotation. Each grating element (55) may also have opposite first and second grating cavities (55a, 55b) for allowing the product (3) to be grated via a driving of the grating drum (11) along opposite directions of rotation. According to a possible embodiment, each grating cavity (55a,55b) of each grating element (55) has at least one cutting edge (55d), each grating element (55) may be symmetrical about a center line thereof, and/or the grating elements (55) may be punched into the grating drum (11), for example, etc.

According to a possible embodiment, the grating drum (11) may comprise a plurality of slanted rows (57) of grating elements (55) disposed about the cylindrical grating surface of the grating drum (11). For example, a first slanted row (57a) of grating elements (55) may be positionally offset with respect to an adjacent second slanted row (57b) of grating elements (55). Similarly, the second slanted row (57b) of grating elements (55) may be positionally offset with respect to an adjacent third slanted row (57c) of grating elements (55). Similarly also, the third slanted row (57c) of grating elements (55) may be positionally offset with respect to an adjacent fourth slanted row (57d) of grating elements (55). Optionally also, grating elements (55) of the fourth slanted row (57d) of grating elements (55) could be aligned with respect to grating elements (55) of the first slanted row (57a) of grating elements (55).

According to a particular embodiment, a first given slanted row (57a) of grating elements (55) includes seven grating elements (55), and a second adjacent slanted row (57b) of grating elements (55) includes eight grating elements. The grating drum (11) may be made of stainless steel, for example, although various other types of suitable materials could also be used for the present grating device (1).

As can be easily understood when referring to the accompanying drawings, first and second opposite rims (11a,11b) of the grating drum (11) may be provided respectively with corresponding first and second covering inserts (59,61). The covering inserts (59, 61) may be overmolded onto the opposite rims (11a, 11b) of the grating drum (11), for example. The opposite rims (11a, 11b) of the grating drum (11) could also be provided with corresponding indents (63) for receiving the corresponding covering inserts (59, 61). According to a possible embodiment, the covering inserts (59, 61) are made of a polymeric material (ex. ABS, etc.), for example, although various other types of suitable materials could also be used.

According to a possible embodiment, a first covering insert (59) is configured for receiving a corresponding handle (65) intended to rotatably drive the grating drum (11), and a second covering insert (61) is configured to cooperate with a securing component (67) of the grating drum (11). The handle (65) may be provided with a rotating knob (69) being pivotably mountable about a distal end of the handle (65), for example. Optionally also, the knob (69) may comprise opposite first and second flattened sides (69a, 69b) for ergonomic handling by a user of the grating device (1). The handle (65) may be operatively mountable into the first covering insert (59) of the grating drum (11) via a corresponding connection mechanism (71), which may comprise at least one clip (73) disposed about a bottom section of the handle (65), for example. According to a particular embodiment, the connection mechanism (71) may comprise four clips (73) being distanced with respect to one another (ex. equally) about a bottom section of the handle (65).

As can be easily understood when referring to the accompanying drawings, the first housing (5) may comprise at least one side wall and a bottom wall (5e), said walls defining a containment space for containing the biasing assembly (13), and for encasing the product (3) to be grated. According to a particular embodiment, the first housing (5) may comprise opposite first and second end side walls (5a, 5b), and opposite first and second longitudinal side walls (5c, 5d), for example, and a plurality of side walls of the first housing (5) may be curved outwardly towards the second housing (7), for example.

Optionally also, opposite upper support portions of the first housing (5) may be complementary in shape to an outer shape of a main portion of the second housing (7). For example, the main portion of second housing (7) may be substantially cylindrical, in which case, the upper support portions of the first housing (5) may be arched, for example.

According to a possible embodiment, the longitudinal side walls (5c, 5d) may have upper support finger-receiving sections (75) for receiving at least one finger of a user of the grating device (1), and the upper finger-receiving sections (75) may be slanted, for example, with respect to the longitudinal side walls (5c, 5d), to provide a gripping section of the first housing (5).

Optionally also, the first housing (5) may comprises at least one bottom anti-skidding pad (77), and according to a particular embodiment, the first housing (5) comprises a pair of elongated bottom anti-skidding pads (77), said pads (77) being positioned at opposite sides of the first housing (5), for example.

As can be easily understood when referring to the accompanying drawings, the second housing (7) is operatively and removably connectable to the first housing (5) via at least one interlocking assembly (79), and the at least one interlocking assembly (79) may comprise complementary male and female components (79a,79b), with at least one male component (79a) being provided about the second housing (7), and at least one corresponding female component (79b) being provided about first housing (5), for example. Optionally also, the at least one interlocking assembly (79) may comprises a pair of spaced-apart projecting tabs (79c) provided about the second housing (7), said pair of spaced-apart projecting tabs (79c) being removably insertable into a pair of corresponding orifices (79d) provided on opposite side walls of the first housing (5), for example. Various other types of interlocking assemblies (79) could also be used for the present grating device (1).

As may now better be appreciated, the present invention is a substantial improvement over the know prior art in that, by virtue of its design and components, as explained herein, and the particular configuration of the grating device and/or components/accessories thereof according to the present system enable to grate material (ex. cheese, chocolate, etc.) more conveniently and ergonomically. The present system also advantageously allows to grate cheese in a quicker, easier, simpler, faster, more efficient, more economical, more reliable, more adjustable, more versatile, more adjustable, more sustainable and/or more desirable manner than what is possible with other known conventional grating devices and/or methods.

Of course, and as can be easily understood by a person skilled in the art, the scope of the claims should not be limited by the possible embodiments set forth in the examples, but should be given the broadest interpretation consistent with the description as a whole.

Furthermore, although preferred embodiments of the present invention have been briefly described herein and illustrated in the accompanying drawings, it is to be understood that the invention is not limited to these embodiments and that various changes and modifications could be made without departing form the scope and spirit of the present invention, as defined in the appended claims and as apparent to a person skilled in the art.

The invention claimed is:

1. A grating device for grating a solid product capable of being grated, the grating device comprising:
   a first housing being positioned, shaped and sized for encasing the product to be grated;
   a second housing operatively connectable to the first housing, the second housing having a loading section being configured for receiving the product to be grated;
   a grating drum rotatably mountable about the second housing, and being positioned, shaped and sized for grating the product from the loading section of the second housing via a rotation of the grating drum against said product; and
   a biasing assembly operatively cooperable with the first housing for biasing the product to be grated inside the loading section of the second housing towards and against the grating drum;
   wherein the first housing comprises at least one side wall and a bottom wall, said walls defining a containment space for containing the biasing assembly, and for encasing the product to be grated; wherein the first housing comprises opposite first and second end side walls, and opposite first and second longitudinal side walls; and wherein a plurality of side walls of the first housing project outwardly towards the second housing;
   wherein opposite upper support portions of the first housing are complementary in shape to an outer shape of a main portion of the second housing;
   wherein said main portion of the second housing is cylindrical, and wherein said upper support portions of the first housing are arched;
   wherein the longitudinal side walls have upper recessed sections for receiving at least one finger of a user of the grating device; and
   wherein the upper recessed sections are slanted with respect to the longitudinal side walls to provide a gripping section of the first housing.

2. A grating device according to claim 1, wherein the biasing assembly includes at least one spring operatively extendable between a given wall of the first housing and the product to be grated, for urging the product to be grated towards and against the grating drum.

3. A grating device according to claim 2, wherein a first extremity of the at least one spring is operatively connectable to a first pushing component configured for operatively pushing against the given wall of the first housing, and wherein a second extremity of the at least one spring is operatively connectable to a second pushing component configured for operatively pushing against the product to be grated; wherein the first pushing component is provided with a protruding section being removably insertable into a corresponding cavity provided about the given wall of the first housing; wherein the corresponding cavity provided about the given wall of the first housing is a through-hole cavity; wherein the protruding section of the first pushing component has a rectangular profile, and wherein the corresponding cavity provided about the given wall of the first housing has a complementary rectangular profile; wherein the at least one spring includes at least one pair of springs, the springs being provided about opposite sides of a same pushing component; wherein the least one spring includes two pairs of springs, each pair of springs being provided about a corresponding opposite distal side of the same pushing component; wherein each spring is disposed about a corresponding guiding post operatively projecting from the same pushing component; wherein each guiding post has an elongated body extending between first and second ends, said elongated body being shaped, positioned and sized for allowing an operative pushing component of the grating device to travel therealong, the first end of the guiding post being securely affixed to a first pushing component, and the second end of the guiding post being configured for preventing egress of the second pushing component from the guiding post; wherein each guiding post is slidably insertable into a corresponding bore of the second pushing component for allowing the second pushing component to travel freely along the elongated body of the guiding post, and wherein the second end of each guiding post is configured to be capped with a corresponding closing plate for preventing egress of the second pushing component from the guiding post; wherein each bore of the second pushing component is positioned downwardly with respect to a corresponding supporting surface of the second pushing component to support the product to be grated; wherein each guiding post has an X-shaped cross-sectional profile; and wherein the second end of each guiding post is melted onto a corresponding receiving portion of a closing plate for creating a permanent connection with the closing plate.

4. A grating device according to claim 3, wherein the first pushing component comprises at least one stopping flange being positioned, shaped and sized for delimiting a minimal distance between the first and second pushing components when said pushing components are compressed towards one another; wherein the at least one stopping flange includes a pair of stopping flanges, each stopping flange being provided about a corresponding side of the first pushing component; wherein the least one stopping flange is further configured for providing the first pushing component with structural rigidity; and wherein the least one stopping flange has a trapezoid-shaped profile.

5. A grating device according to claim 3, wherein the second pushing component comprises a curved supporting surface for supporting the product being biased by the biasing assembly, and to be grated via the grating drum; and wherein the curved supporting surface of the second pushing component is complementary to an outer shape of the grating drum.

6. A grating device according to claim 1, wherein the grating drum is insertable into a corresponding recess defined within the second housing; wherein the second housing has first and second openings, the grating drum being insertable into the second housing via the first opening thereof, and wherein a distal rim of the grating drum is configured to be operatively mountable and rotatable about the second opening of the second housing; wherein the distal rim of the grating drum is further configured to be connectable with a securing ring being removably mountable about the second opening of the second housing; wherein the distal rim of the grating drum is connectable with the securing ring via an interlocking mechanism; wherein the interlocking mechanism comprises complementary male and female components, at least one male component being provided about the securing ring, and at least one corresponding female component being provided about the distal rim of the grating drum; wherein the at least one corresponding female component is L-shaped, including a first insertion portion and a second abutment portion; wherein the second opening of the second housing is further configured for releasing product having been grated by the grating device; and wherein the securing ring is coaxially mounted with respect to the second opening of the second housing, thereby allowing grated product to exit through the securing ring and corresponding second opening of the second housing.

7. A grating device according to claim 6, wherein the grating device includes a cap being operatively mountable onto the second opening of the second housing for selectively closing said second opening of the second housing and preventing product having been grated from being released; wherein the cap is removably mountable onto the securing ring, and is positioned, shaped and sized for selectively closing said second opening of the second housing; wherein the cap is provided with a handling tab for facilitating handling of the cap from the second housing; wherein the handling tab of the cap is provided with at least one finger-receiving rib; wherein the grating drum comprises a cylindrical grating surface provided with a plurality of grating elements; wherein each grating element comprises a grating body protruding from a main body of the grating drum and having at least one grating cavity for allowing the product to be grated via a driving of the grating drum along a given direction of rotation; wherein each grating element has opposite first and second grating cavities for allowing the product to be grated via a driving of the grating drum along opposite directions of rotation; wherein each grating cavity of each grating element has at least one cutting edge; and wherein each grating element is symmetrical about a center line thereof.

8. A grating device according to claim 7, wherein the grating elements are punched into the grating drum; wherein the grating drum comprises a plurality of slanted rows of grating elements disposed about the cylindrical grating surface of the grating drum; wherein a first slanted row of grating elements is positionally offset with respect to an adjacent second slanted row of grating elements; wherein the second slanted row of grating elements is positionally offset with respect to an adjacent third slanted row of grating elements; wherein the third slanted row of grating elements is positionally offset with respect to an adjacent fourth slanted row of grating elements; wherein grating elements of the fourth slanted row of grating elements are aligned with respect to grating elements of the first slanted row of grating elements; wherein a first given slanted row of grating elements includes seven grating elements, and wherein a second adjacent slanted row of grating elements includes eight grating elements; and wherein the grating drum is made of stainless steel.

9. A grating device according to claim 1, wherein first and second opposite rims of the grating drum are provided respectively with corresponding first and second covering inserts; wherein the covering inserts are overmolded onto the opposite rims of the grating drum; wherein the opposite rims of the grating drum are provided with corresponding indents for receiving the corresponding covering inserts; wherein the covering inserts are made of a polymeric material; and wherein a first covering insert is configured for receiving a corresponding handle to rotatably drive the grating drum, and wherein a second covering insert is configured to cooperate with a securing component of the grating drum.

10. A grating device according to claim 9, wherein the handle is provided with a rotating knob being pivotally mountable about a distal end of the handle; wherein the knob comprises opposite first and second flattened sides for ergonomic handling by a user of the grating device; wherein the handle is operatively mountable into the first covering insert of the grating drum via a corresponding connection mechanism; wherein the connection mechanism comprises at least one clip disposed about a bottom section of the handle; and wherein the connection mechanism comprises four clips being distanced with respect to one another about a bottom section of the handle.

11. A grating device according to claim 1, wherein the first housing comprises at least one bottom anti-skidding pad.

12. A grating device according to claim 1, wherein the first housing comprises a pair of elongated bottom anti-skidding pads, said pads being positioned at opposite sides of the first housing.

13. A grating device according to claim 1, wherein the second housing is operatively and removably connectable to the first housing via at least one interlocking assembly.

14. A grating device according to claim 13, wherein the at least one interlocking assembly comprises complementary male and female components, at least one male component being provided about the second housing, and at least one corresponding female component being provided about the first housing.

15. A grating device according to claim 13, wherein the at least one interlocking assembly comprises a pair of spaced-apart projecting tabs provided about the second housing, said pair of spaced-apart projecting tabs being removably insertable into a pair of corresponding orifices provided on opposite side walls of the first housing.

16. A grating device grating device for grating a solid product capable of being grated, the grating device comprising:
 a first housing being positioned, shaped and shaped for encasing the product to be grated;
 a second housing operatively connectable to the first housing, the second housing having a loading section being configured for receiving the product to be grated;
 a grating drum rotatably mountable about the second housing, and being positioned, shaped and sized for grating the product from the loading section of the second housing via a rotation of the grating drum against said product; and
 a biasing assembly operatively cooperable with the first housing for biasing the product to be grated inside the loading section of the second housing towards and against the grating drum;
 wherein the biasing assembly includes at least one spring operatively extendable between a given wall of the first housing and the product to be grated, for urging the product to be grated towards and against the grating drum; and
 wherein a first extremity of the at least one spring is operatively connectable to a first pushing component configured for operatively pushing against the given wall of the first housing, and wherein a second extremity of the at least one spring is operatively connectable to a second pushing component configured for operatively pushing against the product to be grated; wherein the first pushing component is provided with a protruding section being removably insertable into a corresponding cavity provided about the given wall of the first housing; wherein the corresponding cavity provided about the given wall of the first housing is a through-hole cavity; wherein the protruding section of the first pushing component has a rectangular profile, and wherein the corresponding cavity provided about the given wall of the first housing has a complementary rectangular profile; wherein the at least one spring includes at least one pair of springs, the springs being provided about opposite sides of a same pushing component; wherein the least one spring includes two pairs of springs, each pair of springs being provided about a corresponding opposite distal side of the same pushing component; wherein each spring is disposed about a corresponding guiding post operatively projecting from the same pushing component; wherein each guiding post has an elongated body extending between first and second ends, said elongated body being shaped, positioned and sized for allowing an operative pushing component of the grating device to travel therealong, the first end of the guiding post being securely affixed to a first pushing component, and the second end of the guiding post being configured for preventing egress of the second pushing component from the guiding post; wherein each guiding post is slidably insertable into a corresponding bore of the second pushing component for allowing the second pushing component to travel freely along the elongated body of the guiding post, and wherein the second end of each guiding post is configured to be capped with a corresponding closing plate for preventing egress of the second pushing component from the guiding post; wherein each bore of the second pushing component is positioned downwardly with respect to a corresponding supporting surface of the second pushing component to support the product to be grated; wherein each guiding post has a X-shaped cross-sectional profile; and wherein the second end of each guiding post is melted onto a corresponding receiving portion of a closing plate for creating a permanent connection with the closing plate.

17. A grating device grating device for grating a solid product capable of being grated, the grating device comprising:
 a first housing being positioned, shaped and shaped for encasing the product to be grated;
 a second housing operatively connectable to the first housing, the second housing having a loading section being configured for receiving the product to be grated;
 a grating drum rotatably mountable about the second housing, and being positioned, shaped and sized for grating the product from the loading section of the second housing via a rotation of the grating drum against said product; and
 a biasing assembly operatively cooperable with the first housing for biasing the product to be grated inside the loading section of the second housing towards and against the grating drum;
 wherein the grating drum is insertable into a corresponding recess defined within the second housing; wherein the second housing has first and second openings, the grating drum being insertable into the second housing via the first opening thereof, and wherein a distal rim of the grating drum is configured to be operatively mountable and rotatable about the second opening of the second housing; wherein the distal rim of the grating drum is further configured to be connectable with a securing ring being removably mountable about the second opening of the second housing; wherein the distal rim of the grating drum is connectable with the securing ring via an interlocking mechanism; wherein the interlocking mechanism comprises complementary male and female components, at least one male component being provided about the securing ring, and at least one corresponding female component being provided about the distal rim of the grating drum; wherein the at least one corresponding female component is L-shaped, including a first insertion portion and a second abutment portion; wherein the second opening of the second housing is further configured for releasing product having been grated by the grating device; and wherein the securing ring is coaxially mounted with respect to the second opening of the second housing, thereby allowing grated product to exit through the securing ring and corresponding second opening of the second housing.

18. A grating device according to claim 17, wherein the grating device includes a cap being operatively mountable onto the second opening of the second housing for selectively closing said second opening of the second housing and preventing product having been grated from being released; wherein the cap is removably mountable onto the securing ring, and is positioned, shaped and sized for selectively closing said second opening of the second housing; wherein the cap is provided with a handling tab for facilitating handling of the cap from the second housing; wherein the handling tab of the cap is provided with at least one finger-receiving rib; wherein the grating drum comprises a cylindrical grating surface provided with a plurality of grating elements; wherein each grating element comprises a grating body protruding from a main body of the grating drum and having at least one grating cavity for allowing the product to be grated via a driving of the grating drum along a given direction of rotation; wherein each grating element has opposite first and second grating cavities for allowing the product to be grated via a driving of the grating drum along opposite directions of rotation; wherein each grating cavity of each grating element has at least one cutting edge; and wherein each grating element is symmetrical about a center line thereof.

19. A grating device according to claim 17, wherein first and second opposite rims of the grating drum are provided respectively with corresponding first and second covering inserts; wherein the covering inserts are overmolded onto the opposite rims of the grating drum; wherein the opposite rims of the grating drum are provided with corresponding indents for receiving the corresponding covering inserts; wherein the covering inserts are made of a polymeric material; and wherein a first covering insert is configured for receiving a corresponding handle to rotatably drive the grating drum, and wherein a second covering insert is configured to cooperate with a securing component of the grating drum.

20. A grating device according to claim 17, wherein the second housing is operatively and removably connectable to the first housing via at least one interlocking assembly.

* * * * *